(12) United States Patent  
Piesciorovsky et al.

(10) Patent No.: US 12,170,441 B2  
(45) Date of Patent: Dec. 17, 2024

(54) SYSTEM AND METHOD OF DEVICE VALIDATION

(71) Applicant: UT-Battelle, LLC, Oak Ridge, TN (US)

(72) Inventors: Emilio C. Piesciorovsky, Oak Ridge, TN (US); Travis M. Smith, Oak Ridge, TN (US); Michael W. Marshall, Oak Ridge, TN (US); Srijib K. Mukherjee, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 481 days.

(21) Appl. No.: 17/548,744

(22) Filed: Dec. 13, 2021

(65) Prior Publication Data

US 2022/0200332 A1     Jun. 23, 2022

Related U.S. Application Data

(60) Provisional application No. 63/127,743, filed on Dec. 18, 2020.

(51) Int. Cl.  
    *H02J 13/00*      (2006.01)  
    *G05B 19/042*      (2006.01)

(52) U.S. Cl.  
    CPC ...... *H02J 13/00002* (2020.01); *G05B 19/042* (2013.01); *H02J 13/00001* (2020.01); *G05B 2219/2639* (2013.01)

(58) Field of Classification Search  
    CPC .......... H02J 13/00002; H02J 13/00001; G05B 19/042; G05B 2219/2639; Y02B 90/20; Y04S 20/00  
    See application file for complete search history.

(56) References Cited

U.S. PATENT DOCUMENTS

2021/0109136 A1*   4/2021   Hao .................... G01R 19/0092

OTHER PUBLICATIONS

Ren, W. et al., "Interfacing Issues in Real-Time Digital Simulators IEEE", Task Force on Interfacing Techniques for Simulation Tools, IEEE Transactions on Power Delivery, vol. 26, No. 2, Apr. 2011, pp. 1221-1230.

Liu, Z. et al., "An Intelligent Coordinated Protection and Control Strategy for Distribution Network with Wind Generation Integration", CSEE Journal of Power and Energy Systems, vol. 2, No. 4, Dec. 2016, pp. 23-30.

(Continued)

*Primary Examiner* — Charles R Kasenge  
(74) *Attorney, Agent, or Firm* — Warner Norcross + Judd LLP

(57) ABSTRACT

A system and method for identifying pinout information for an IED and operable to test the IED in accordance with a power system. The pinout information for many IEDs is conventionally lacking, leading to conventional testing systems that utilize amplifiers in order to generate the actual current and voltage levels of a power system for simulating the power system in conjunction with one or more IEDs. A system and method are provided to identify pinouts of an IED that can be utilized for simulating the power system with an IED without the need to generate actual current and voltage levels of the power system.

7 Claims, 17 Drawing Sheets

(56) References Cited

OTHER PUBLICATIONS

Piesciorovsky, E.C. et al., "Comparison of high speed adaptive and nonadaptive backup overcurrent protection on fuse feeders with sensors", International Transactions on Electrical Energy Systems, vol. 29, No. 4, Apr. 2019, pp. 1-17.

Piesciorovsky, E.C. et al., "Comparison of Programmable Logic and Setting Group Methods for adaptive overcurrent protection in microgrids", Electric Power Systems Research 151, 2017, pp. 273-282.

Piesciorovsky, E.C. et al., "Comparison of non-real-time and real-time simulators with relays in-the-loop for adaptive overcurrent protection", Electric Power Systems Research 143, 2017, pp. 657-668.

Sachdev, M.S. et al., "Issues and opportunities for testing numerical relays", 2000 IEEE Power Engineering Society Summer Meeting, vol. 2, 2000, pp. 1185-1190.

* cited by examiner

SYSTEM AND METHOD OF DEVICE VALIDATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of power systems, and more particularly in the realm of real time simulators (RTS) with hardware in the loop (HIL) testing areas of intelligent electronic devices (IEDs) such as microgrid controllers, protective relays, smart meters, phasor measurement units and other electrical grid measurement devices.

BACKGROUND

Conventional electrical utilities consider renewable energy systems as promising generation sources to cover the continuous demand of energy. The proliferation of distributed energy resources is setting the stage for modern distribution power systems to operate as microgrids. Consequently, distribution power systems have been modernized with IEDs, which can take on many roles in a power system, such as the role of microgrid controllers, protective relays, smart meters, phasor measurement units, and other devices from different manufacturers. Given the variability of power systems that interface with IEDs and the various roles of the IEDs, different test opportunities are available to study and analyze IEDs in today's electrical grids.

One testing and validation option is to build the hardware of the system, but this method is normally expensive and takes a significant effort to implement in a complex system.

Another conventional alternative is to study the system through a RTS and HIL. This conventional alternative provides a means for the operation of physical hardware, such as power components and control hardware, while interfaced with a computer simulation of the system in which the physical hardware is intended to function. Such conventional RTS systems attempt to test microgrid protection and control systems with multiple IEDs in the loop in an effort to validate the coordination between downstream and upstream protective relays before installing the system in the field.

However, these conventional RTS systems rely on costly components, such as costly amplifiers for voltage and current, in order to simulate the power system for the IED. For example, in electrical substations, IEDs operating as protective relays are connected to current transformers (CTs) and voltage transformers (VTs) to collect high voltage and current signals, respectively, for three-phase signals. These are quite different from the low-voltage level signals available for a conventional RTS. As a result, voltage and current amplifiers are used by the RTS system to scale simulated three-phase signals from the RTS before connecting to the physical IEDs operating as protective relays.

Costly amplifiers are required in conventional RTS systems because pinout information for a given IED is not always available. For example, the manufacturer may not provide pinout information in the manual for a given IED. This lack of information is particularly prevalent relative to low-level test interface pinout information, necessitating the use of costly amplifiers and circuitry for testing and validation of the IED in the power system.

Some conventional RTS and HIL test beds have used commercial relay test systems as amplifiers. These relay test systems are power sources that allow testing of protective relays at frequencies no higher than 3 kHz due to limitations on their operating frequency ranges. For instance, the Doble F6150 power system simulator and the OMICRON CMC 356 test bed generate frequencies from 0.1 to 2,000 Hz and 1 to 3,000 Hz, respectively. These limited operating frequencies limit the ability of the conventional RTS and HIL test beds (with relay-based amplifier systems) to conduct simulations for power systems that involve photovoltaic inverter-based distributed generators in microgrids, where such power systems require greater operating frequencies.

In conventional RTS and HIL test beds with amplifiers, the primary currents/voltages are simulated by the RTS and are converted into low-level voltage signals. Then, the amplifiers scale the low-level voltage signals into secondary currents/voltages to be measured by IEDs in the loop. In RTS with HIL test beds, a time step of 50 µs is often selected for power system simulations. This relates to 20,000 samples per second (sample rate of 20 kHz). This is then used to generate current/voltage signals (333.3 samples per cycle for 60 Hz). To have the same signal resolution, amplifiers and IEDs must have a sample rate of 20 kHz. This is based on the concepts of the Nyquist theorem, which states that the sampling rate of analog-to-digital converter should be greater than or equal to twice of the signal bandwidth. In this example, the sample rate was twice the signal bandwidth, which indicates that 10 kHz should be the highest frequency that can be simulated and measured by the conventional RTSs and IEDs, respectively. However, relay test systems as amplifiers in RTS with HIL test beds can scale voltages and currents up to 3 kHz, which is much less than 10 kHz.

Additionally, IEDs operable as digital relays have anti-aliasing filters that prevent aliasing a higher frequency on the nominal frequency by rejecting all frequencies above a cutoff value. Therefore, to measure the current or voltage frequency from IEDs operable as digital relays wired with an RTS, an IED operable as a digital relay needs to be selected with a filter cutoff frequency that is considerably higher than the highest expected off-nominal frequency value. To ensure an accurate frequency measurement, the IED selected in order to allow testing may be specified with a value of the filter cutoff frequency that is approximately one-third of the sampling rate.

SUMMARY

In general, one innovative aspect of the subject matter described herein can be embodied in a system for determining low-voltage interface of an intelligent electronic device (IED) of a power system, where the low-voltage interface includes one or more of locations of pinouts of the IED, voltage levels of the pinouts, functions of the pinouts, or current and/or voltage scaling factors. The system may include an interface module that includes a plurality of connectors configured to be electrically connected in one-to-one correspondence to the pinouts of the IED and one or more switches, which may be configured to provide power to one or more pinouts of the plurality of pinouts of the IED, when a voltage signal from a power source is electrically coupled to the interface module, to selectively provide a sinusoidal signal or a pulse signal to one or more connectors of the plurality of connectors, and to select testing modes. The system may include a sensor system operable to identify one or more pinout voltage levels of the IED when the voltage signal from the power source is electrically coupled to the interface module, and a controller communicatively coupled with the interface module, the power source, and a SCADA module operating in conjunction with the IED.

The controller may be configured to obtain, from the SCADA module, signals induced in the IED in response to predetermined voltage inputs by the power source to the IED through a first set of the connectors, and to determine functionality of input pinouts of the IED corresponding to the first set of connectors based on the obtained signals. The controller may be configured to obtain, from a SCADA module, measurements of currents through, and voltages across, the IED corresponding to a sequence of voltages of different amplitudes that is input by the power source to the IED through a first set of the connectors, and to calculate current- or voltage-scaling factors for the input pinouts based on the obtained measurements.

The foregoing and other embodiments can each optionally include one or more of the following features, alone or in combination. In particular, one embodiment includes all the following features in combination.

In some embodiments, as part of determining functionality of each of the input pinouts, the controller may be configured to determine that each of the input pinouts corresponds to: an analog input of the IED associated with an analog phase current or an analog phase-to-ground voltage, or a digital input of the IED associated with a breaker pole state.

In some embodiments, the controller may be communicatively coupled with a real-time simulator (RTS) with the IED in a loop, and may be configured to obtain, from the SCADA module, signals output by the IED through a second set of the connectors, and to determine functionality of LED's output pinouts corresponding to the second set of connectors based on the obtained output signals.

In some embodiments, the one or more switches may be configured to select connectivity between the connectors and the pinouts of the IED, and the controller may be configured to verify continuity between the connectors and the pinouts of the IED.

In some embodiments, the IED may include one of a protective relay, a smart meter, a phasor-measurement unit, a microgrid controller or a microcontroller measurement device applied in a power system.

In some embodiments, a method may be provided for determining the low-voltage interface of an IED of a power system by using a system described herein, and operating the IED in connection with an overhead power line low-voltage sensor.

In some embodiments, the pinouts of the IED may be electrical contacts.

In general, one innovative aspect of the subject matter described herein can be embodied in a system for determining low-voltage interface of an intelligent electronic device (IED) of a power system, where the low-voltage interface includes one or more of locations of electrical contacts of the IED, voltage levels of the electrical contacts, functions of the electrical contacts, or current and/or voltage scaling factors. The system may include a power source operable to provide a voltage output.

The system may include a first connector configured to be electrically connected to a first electrical contact of the IED, and a first switch operable to selectively couple the voltage output to the first electrical contact of the IED via the first connector.

The system may include a second connector configured to be electrically connected to a second electrical contact of the IED, and a second switch operable to selectively couple the voltage output to the second electrical contact of the IED via the second connector.

The system may include a controller communicatively coupled with the first and second switches and the power source. The controller may be configured obtain sensor information pertaining to a signal induced in the IED in response to supply of the voltage output to at least one of the first and second electrical contacts of the IED, and to determine functionality of at least one of the first and second electrical contacts of the IED based on the sensor information.

The foregoing and other embodiments can each optionally include one or more of the following features, alone or in combination. In particular, one embodiment includes all the following features in combination.

In some embodiments, the power source may be operable to supply a first voltage output and a second voltage output, wherein the first voltage output has a first amplitude different from a second amplitude of the second voltage output.

In some embodiments, the first and second voltage outputs may be selectively coupled to the voltage output of the power source.

In some embodiments, the first voltage output may correspond to the voltage output, where the first and second switches may be operable to selectively couple one of the first voltage output and the second voltage output respectively to the first and second electrical contacts of the IED.

In some embodiments, the controller may be operable to receive sensor feedback from the IED indicative of at least one of a voltage and a current associated with the first electrical contact, where the controller may be configured to determine at least one of a current-scaling factor and a voltage-scaling factor based on the sensor feedback.

In some embodiments, the sensor information may include a first current and a first voltage of power supplied to the first electrical contact and a second current and a second voltage of power supplied to the second electrical contact of the IED.

In some embodiments, the controller may be operable, based on the sensor information, to determine if the first electrical contact corresponds to one of an analog input and a digital input.

In some embodiments, the controller may be operable to determine, based on the sensor information, to determine if the second electrical contact corresponds to a digital output.

In some embodiments, the controller may be operable to validate functionality of the first and second electrical contacts of the IED.

In general, one innovative aspect of the subject matter described herein can be embodied in a system for determining low-voltage interface of an intelligent electronic device (IED) of a power system. The system may include a power source operable to supply first and second supply signals, and a plurality of connectors configured to be electrically connected to the IED. A first connector of the plurality of connectors may be operable to connect to a first electrical contact of the IED, and a second connector of the plurality of connectors may be operable to connect to a second electrical contact of the IED.

The system may include a plurality of switches operable to selectively supply the first and second supply signals to the plurality of connectors.

The system may include a controller communicatively coupled with the plurality of switches, and configured to obtain first sensor information pertaining to a first signal induced in the IED in response to supply of the first supply signal to at least one of the first and second electrical contacts of the IED. The controller may be configured to obtain second sensor information pertaining to a second signal induced in the IED in response to supply of the second supply signal to at least one of the first and second electrical contacts of the IED, and to determine functionality of at least one of the first and second electrical contacts of the IED based on the first and second sensor information.

The foregoing and other embodiments can each optionally include one or more of the following features, alone or in combination. In particular, one embodiment includes all the following features in combination.

In some embodiments, the controller may be operable, based on the first sensor information, to determine if the first electrical contact corresponds to one of an analog input and a digital input.

In some embodiments, the controller may be operable, based on the first sensor information, to determine if the first electrical contact corresponds to one of an analog input and a digital input.

In some embodiments, the controller may be operable to determine, based on the second sensor information, to determine if the second electrical contact corresponds to a digital output.

In some embodiments, the controller may be operable to validate functionality of the first and second electrical contacts.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION

Figure 1:
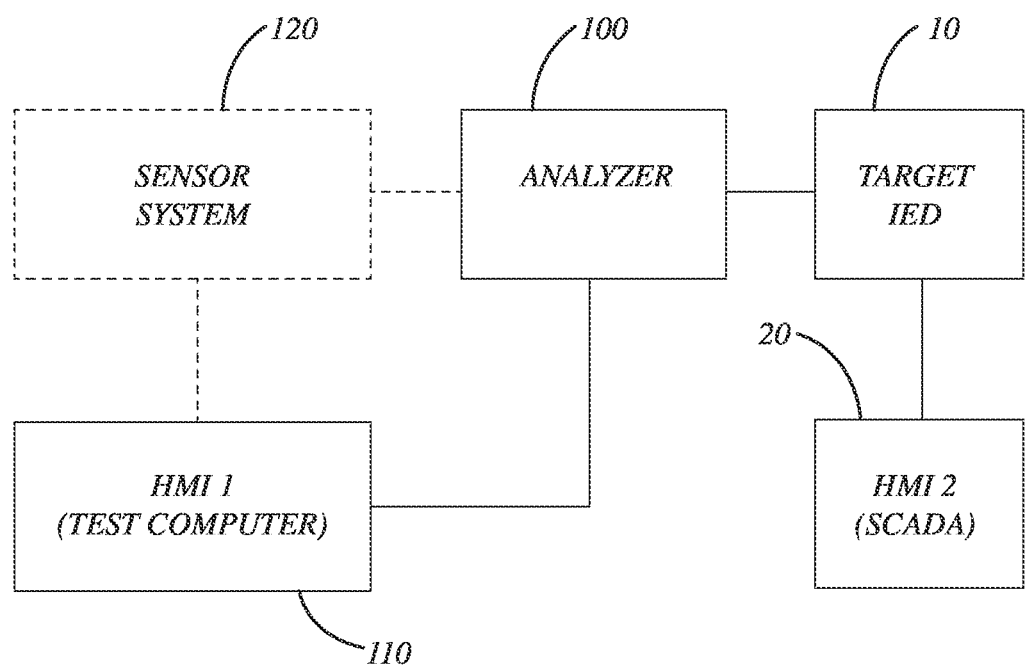
FIG. 1 shows a system in one embodiment according to the present disclosure.

The present disclosure is directed to a system and method of identifying pinout information for an IED and operable to test the IED in accordance with a power system. The pinout information for IEDs is conventionally lacking, leading to conventional RTS systems that utilize amplifiers in order to generate the actual current and voltage levels of a power system for simulating the power system in conjunction with one or more IEDs. One embodiment according to the present disclosure is able to identify pinouts of an IED that can be utilized for simulating the power system with an IED without the need to generate actual current and voltage levels of the power system.

While most IEDs operable as protective relays do not have their low-level test interfaces documented, like the ones from Schweitzer Engineering Laboratories (SEL), the low-voltage interfaces are available for most devices. These low-voltage interfaces can be discovered and connected to for testing, simulation, and validation. It is noted that protection and control system test beds with RTSs and HIL (without amplifiers) can be based on IEDs of the same type, such as the SEL protective relays, if instruction manuals for the IEDs provide low-level test interface pinout locations and current/voltage scaling factors. However, as described herein, this type of information is often absent.

Additionally, power systems in practice rarely use the same type of IED across the entire system. The power system is much more likely to incorporate IEDs of different types, for many of which the low-level test interface pinout locations are not documented. The variety and lack of documentation for IEDs in the power system prevents conventional RTS systems from being capable of testing and validating the power system without use of costly amplification circuitry to simulate actual voltages and currents provided in the power system.

A test bed with RTSs and HIL using several and multi-vendor IEDs provide a more realistic scenario than a test bed using IEDs from one vendor to validate electrical utility protection and control systems. In one embodiment, finding the low-level test interfaces of IEDs, operable as protection devices, that do not provide this low-level test interface enables testing and validation for IEDs with low-level voltage interfaces of overhead sensor signals (e.g., LINDSEY) instead of VTs/CTs (conventional practice). This improves the connectivity of analog signals from an overhead sensor with IEDs operable as protective relays.

In one embodiment, in microgrids with photovoltaic (PV) plants, the typical switching frequency of direct current (DC)/DC and DC/alternating current (AC) converters is often operated according to a pulse width modulation technique, with a switching frequency higher than 3 kHz. Higher-order harmonics up to the 100th order (6 kHz), can be a concern in large-scale PV inverter-based distributed generators. Therefore, in a conventional amplifier-based RTS and HIL, the PV inverter-based distributed generator microgrid test beds simulated with RTS and HIL may require amplifiers that scale high-frequency currents and voltages. Amplifiers have operating frequency limitations in scaling high-frequency current and voltage signals, and need to be specified and configured to operate in such a system. A system in accordance with one embodiment of the present disclosure may avoid such amplifier requirements.

A system in accordance with one embodiment may provide digital signal processing technology for RTSs with HIL for testing power grid protection, communication, and control systems. Additionally, the system may provide a test bed without amplifiers to allow wiring of multiple IEDs (potentially from different vendors) directly to an RTS at a reduced cost before finding the IEDs' pinout locations and functions and current/voltage scaling factors. An interface method in accordance with one embodiment may be utilized to find unknown pinouts of IEDs, enabling the system to obtain one or more of the following: the pinout locations, voltage levels, functions, and current/voltage scaling factors.

A method in accordance with one embodiment of the present disclosure may allow creation of more realistic test beds by wiring multiple IEDs (potentially from different vendors) without amplifiers. The method may reduce test bed costs without using relay test systems as amplifiers, and may eliminate the operating frequency limitation of amplifiers for conventional RTS with HIL test beds.

I. Overview

Figure 2:
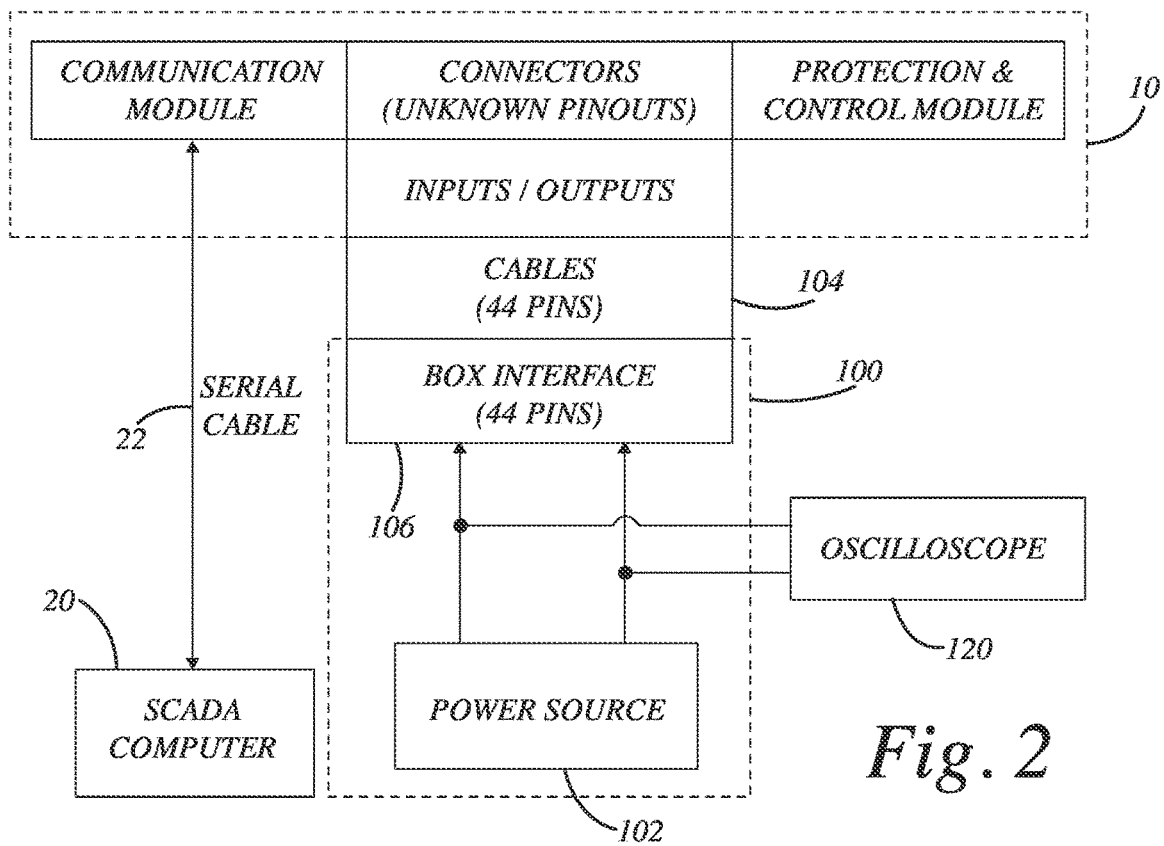
FIG. 2 shows a system in one embodiment according to the present disclosure.
Figure 3:
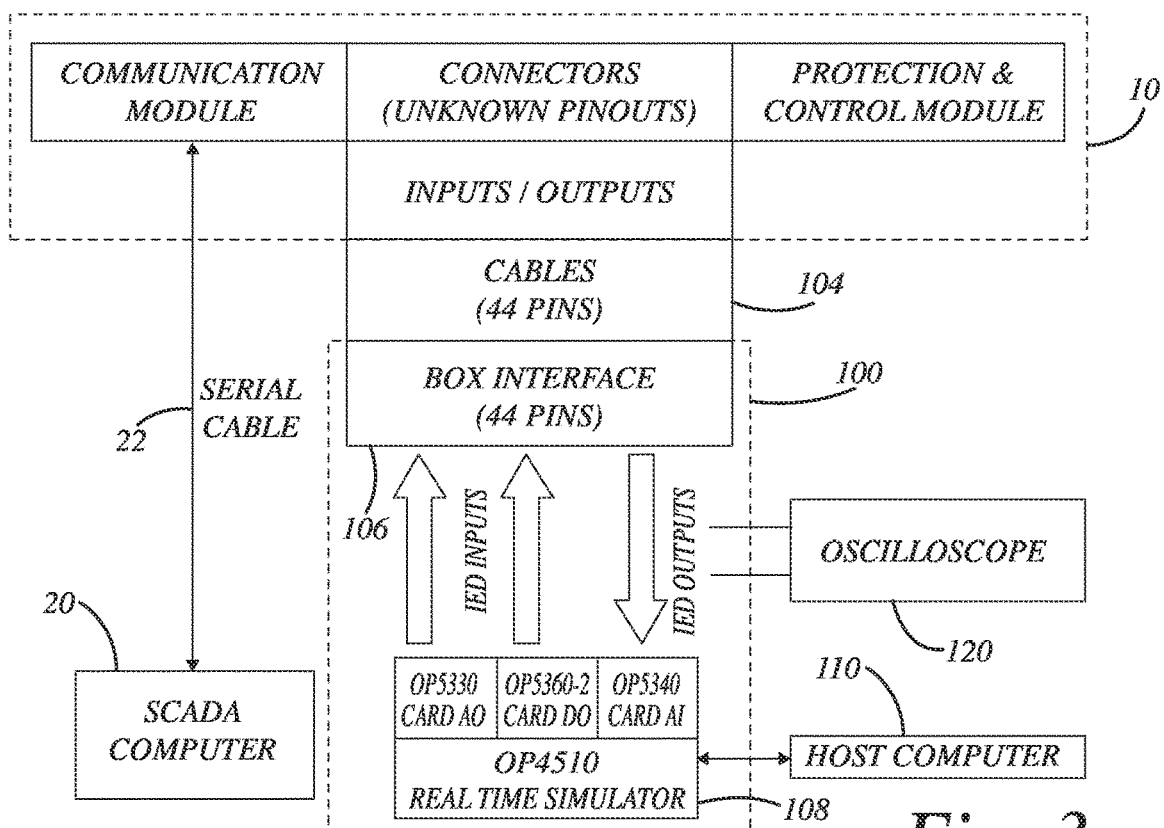
FIG. 3 shows a system in one embodiment according to the present disclosure.

A system in accordance with one embodiment of the present disclosure is depicted in FIGS. 1-3 and designated 100. The system 100 may form an IED analyzer for a target IED 10. For purposes of disclosure, the system 100 is described in conjunction with a single target IED 10; however, it is to be understood that the system 100 may be configured for operation with a plurality of target IEDs 10, which may include a variety of differently configured IEDs.

The system 100 may include an IED interface 106 operable to electrically connect to electrical terminals of the target IED 10. The electrical terminals of the target IED 10 may each correspond to an input or an output, where the input or output may be analog or digital. The system 100, in one embodiment, may be configured to automatically determine a connection type of each electrical terminal, including whether the connection type corresponds to an analog input, an analog output, a digital input, or a digital output. The system 100, in one embodiment, may be reconfigurable based on the connection type of the electrical terminal to supply or receive a signal corresponding to the connection type. For example, for an electrical terminal determined to be an analog input, the system 100 may be operable to configure itself, alone or in conjunction with an external command, to supply an analog signal to the analog input of the target IED 10.

The system 100 in the illustrated embodiment may include a control system 108, which includes one or more of the following: a processor, memory, an input interface, and an output interface. The input interface may include one or more input communication interfaces, including, for example, wired communication and wireless communication capabilities. Likewise, the output interface may include one or more output communication interfaces, including at least one wired interface and at least one wireless interface, or any combination thereof. The processor and memory may be configured to facilitate operation in accordance with one or more embodiments described herein, including, for example, determining a connection type of an electrical terminal of a target IED 10 and operating in accordance with the determined connection type to simulate a power system and validation operation of the target IED 10 in the power system. The memory may store encoded instructions for directing the processor in accordance with one or more embodiments described herein.

The system 100 may be coupled to one or more components of the system 100 to achieve operation in accordance with the described functionality and methodology.

The system 100 may include any and all electrical circuitry and components to carry out the functions and algorithms described herein. Generally speaking, the system 100 may include one or more microcontrollers, microprocessors, and/or other programmable electronics that are programmed to carry out the functions described herein. The system 100 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions, or they may reside in a common location. When physically distributed, the components may communicate using any suitable serial or parallel communication protocol, such as, but not limited to, CAN, LIN, FireWire, I2C, RS-232, RS-485, and Universal Serial Bus (USB).

In the illustrated embodiment of FIG. 2, the system 100 may include a power source 102, which may be controllable to vary an output of power supplied to the target IED 10 via the IED interface 106. For instance, the system 100 may control a voltage level or amount of current output from the power source 102 to an electrical connector 11 of the target IED 10. Additionally, or alternatively, signal characteristics of power supplied from the power source 102 to an electrical connector to the target IED 10 may be controlled. For instance, the power source 102 may be operable to generate a square wave signal or a sinusoidal signal, with characteristics thereof, such as frequency, being controlled.

In the illustrated embodiment of FIG. 3, the system 100 may be operably coupled to a first human machine interface (HMI) 110, which may be configured similar to the system 100 in several respects, including one or more of the following: a processor, memory, an input interface, and an output interface. The first HMI 110 may be configured to communicate with the system 100 to obtain sensor information and status information regarding operation of the system 100. The first HMI 110 may be communicatively coupled with the system 100 via an Ethernet connection provided respectively via input and output interfaces.

Sensor information may include voltage and/or current values of analog signals supplied to the target IED 10 and may state information of digital signals provided to and output from the target IED 10, or any combination thereof. The output interface of the first HMI 110 may include a display operable to provide sensor information and status information with respect to the system 100. The input interface of the first HMI 110 may enable receipt of directives from an operator. The first HMI 110 may direct operation of the system 100 via communications based on the directives received from the operator.

In the illustrated embodiments of FIGS. 2 and 3, the system 100 is coupled to a sensor system 120. As described herein, the system 100 may be configured to communicate sensor information to the first HMI 110. The system 100 may obtain the sensor information from the sensor system 120, which may include one or more sensors operable to detect one or more characteristics, such as a characteristic of power, including a characteristic of voltage or a characteristic of current, with respect to analog signals and state information with respect to digital signals, or a combination thereof. The sensor system 120 is shown in the illustrated embodiment as being optionally external to the system 100 in phantom lines; however, it is to be understood that the sensor system 120 may be integral to the system 100. The information received from the sensor system 120 by the system 100 may be communicated to the first HMI 110 as described herein.

In the illustrated embodiment of FIGS. 2 and 3, the sensor system 120 is configured to electrically connect to one or more conductors of the IED interface 106 in order to sense the characteristic of voltages present on each of the one or more conductors of the IED interface 106. The characteristic of voltages as described herein may be sampled at a sampling frequency sufficient to capture a signal representative of the characteristic of power without significant degradation or aliasing of the signal.

The target IED 10 in the illustrated embodiment corresponds to a device under test. The target IED 10 may be an IED having a low level test interface. Functions of each electrical terminal of the low level test interface may be unknown. For instance, the manufacturer of the IED may not provide documentation with respect to the low level test interface. The target IED 10 in the illustrated embodiment includes electrical connectors 11, which some or all of which correspond to unknown pinouts of the target IED 10. The electrical connectors 11 may include connections for a communication module operable to interface with a second HMI 20, as described herein. The electrical connectors 11 may include a protection control module operable for controlling one or more external devices, such as one or more breakers associated with a power system. The electrical connectors 11 may also include connections for a low level testing interface. The electrical connectors may be coupled to the IED interface 106 of the system 100 via one or more cables 104. The electrical connectors 11 corresponding to the communication module operable to interface with the second HMI 20 may provide a serial interface operable for connection to the second HMI 20 via a serial cable 22.

The target IED 10 may be operably coupled to a second HMI 20, which may be a supervisory control and data acquisition (SCADA) system. The second HMI 20 may be operable to obtain sensor information and status information from the target IED 10, and to display such information via an output interface.

In one embodiment, information provided from the second HMI 20 may be compared against information provided from the first HMI 110. Based on a comparison of the information (e.g., sensor information or status information or both), validation of operation of the target IED 10 in accordance with the power system being simulated by the control system 108 may be determined.

II. Method of Operation

Figures 4, 5:
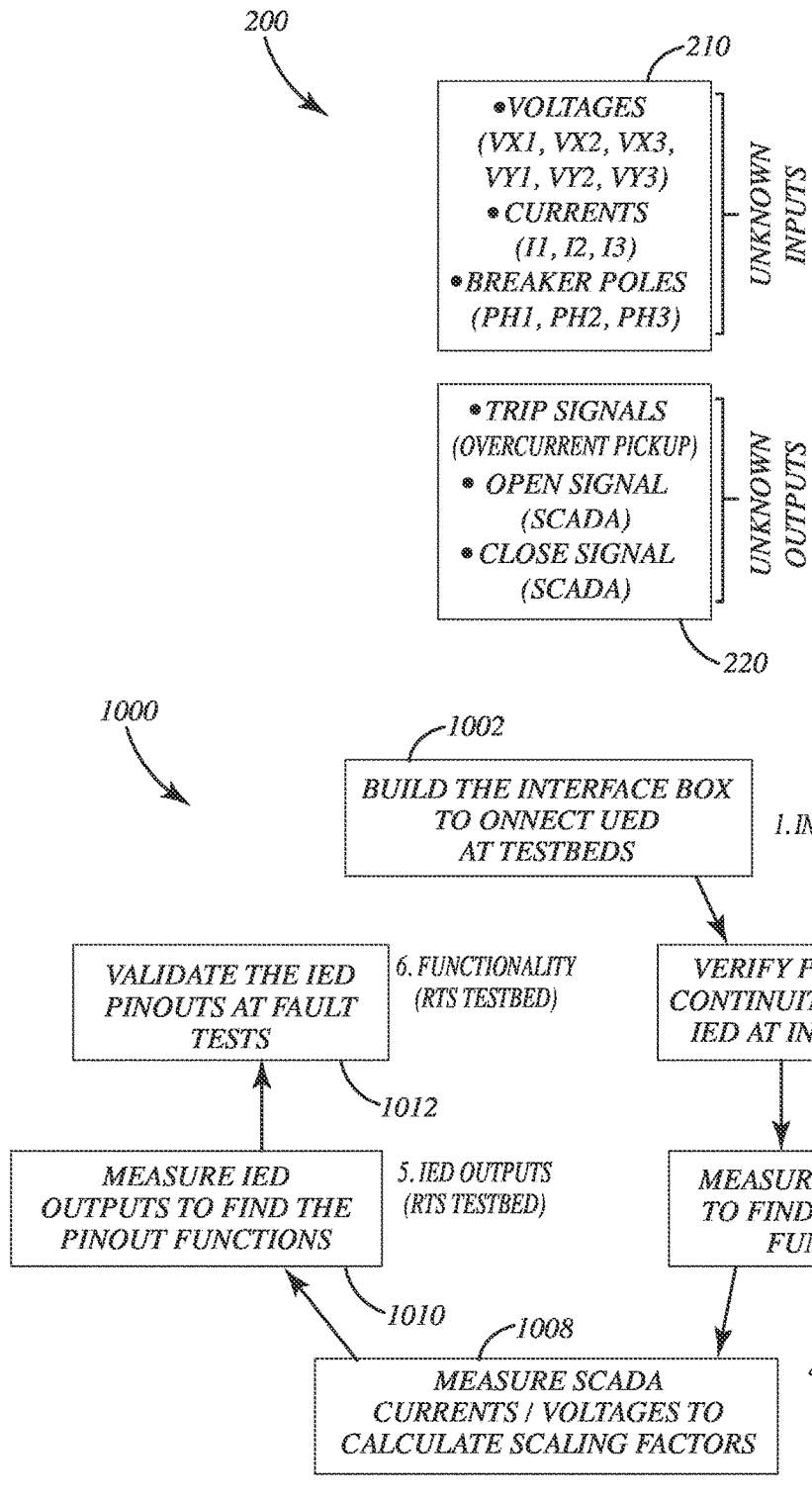
FIG. 4 shows unknown pinouts of an IED in one embodiment according to the present disclosure.
FIG. 5 shows a method in one embodiment according to the present disclosure.

A method of operation in accordance with one embodiment is depicted in the illustrated embodiment of FIG. 5 and generally designated 1000. The method 1000 may be focused on identifying the unknown pinout locations, functions, and scaling factors of the target IED 10, where such information can be determined with respect to a target IED 10 regardless of its vendor, and where such information can be determined in the loop (without amplifiers). The unknown pinout locations, functions, and scaling factors of the target IED 10 may be used for operation of the system as an RTS with the HIL. The method 1000 may be conducted with respect to a target IED 10 operable as a protection device, the IED interface 106 (e.g., an interface box), a sensor system 120 (e.g., a tester), the power source 102, a control system 108 (e.g., a control system 108 operating as an RTS), the second HMI 20 (e.g., SCADA), and a first HMI 110 (e.g., one or more host computers). The unknown IED pinouts 200 for the target IED 10 and a sequence for the method 1000 are shown in FIGS. 4 and 5, respectively. In method 1000, the IED interface 106 is configured to facilitate determining unknown pinouts of the target IED 10, and the number of connectors for the IED interface 106 can be calculated as follows:

$$N_{IB\ connectors} \geq N_{IED\ pinouts}$$

where $N_{IB\ connectors}$ is the number of connectors for the IED interface 106, and $N_{IED\ pinouts}$ is the number of unknown pinouts for target IED 10. Step 1002.

Each connector of the IED interface 106 may be wired to an applicable unknown pinout of the target IED 10. The pinout-cable continuity may be determined via a tester. Step 1004. After the target IED 10 is wired with the IED interface 106, the IED inputs 210, such as voltages (VX1, VX2, VX3, VY1, VY2, VY3), currents (I1, I2, I3), and phase breaker pole states (PH1, PH2, PH3), can be identified. Step 1006. Next, the current/voltage scaling factors can be calculated.

Step 1008. After determining the IED inputs and scaling factors, the IED outputs 220 can be identified for the trip (overcurrent pickup) and close/open (SCADA) signals. Step 1010. The functionality of IED pinouts can be validated at single-line-to-ground (SLG) and three-line (3L) faults simulated with the control system 108 (e.g., RTS) and target IED 10 in the loop. Step 1012.

Figure 6:
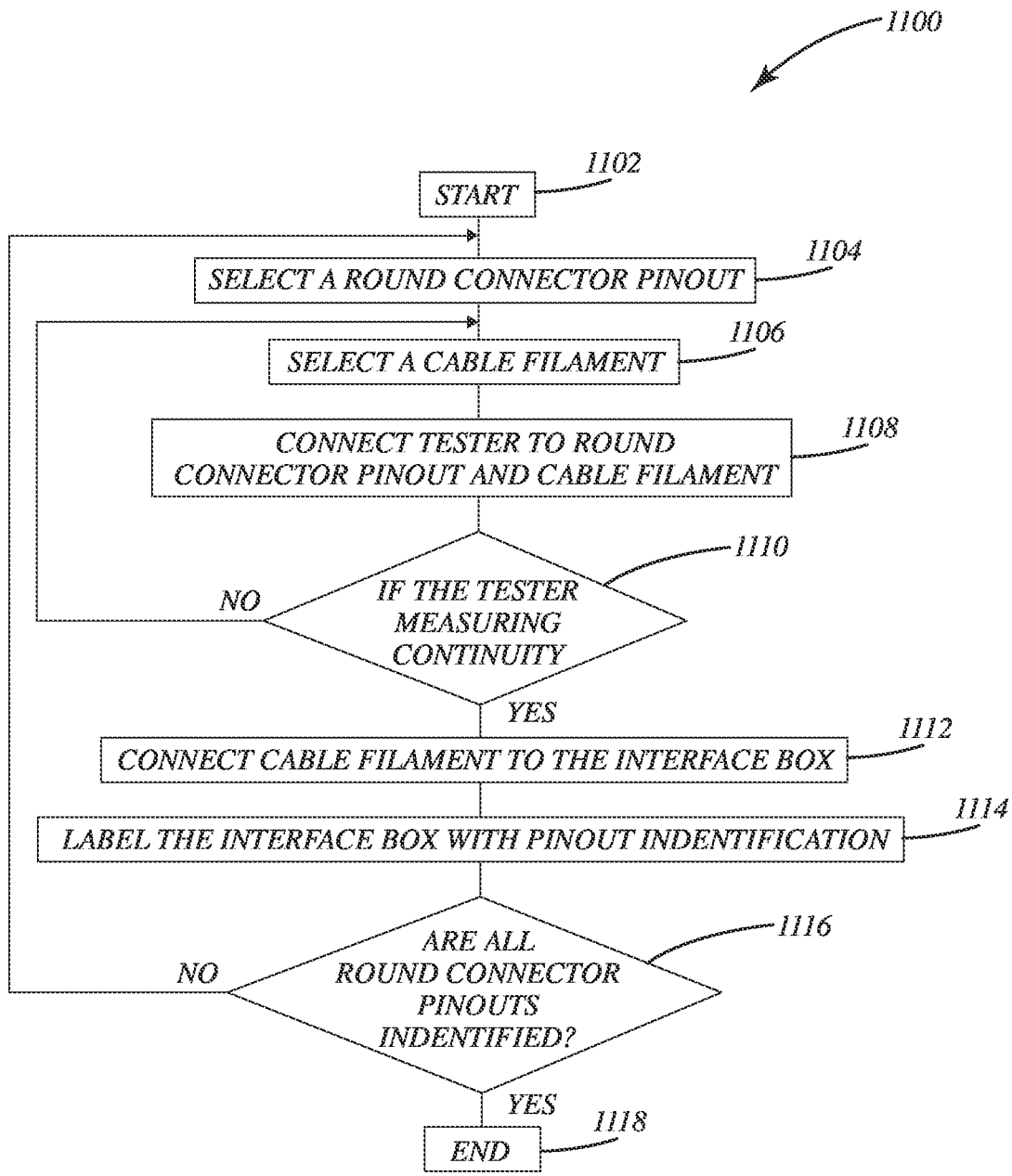
FIG. 6 shows a method in one embodiment according the present disclosure.

In the pinout-cable continuity phase conducted in accordance with step 1004 of the method 1000, the continuity between the IED pinouts 200 and cables 104 to be connected at the IED interface 106 is measured with a tester. In one embodiment, the pinout-cable identifications can be labeled at the IED interface 106. A method to measure the pinout-cable continuity between the IED pinouts 200 and IED interface 106 is shown in FIG. 6 and generally designated 1100.

The method 1100 includes selecting an electrical connector 11 of the target IED 10 and a filament of the one or more cables 104. Step 1102, 1104, 1106. The sensor system 120 may be coupled to the electrical connector 11 and the filament of the one or more cables 104, to determine if there is continuity. Steps 1108, 1110. If there is no continuity, another filament of the one or more cables 104 may be selected, and the continuity test may be repeated until continuity is identified. After continuity is identified, the filament of the one or more cables 104 may be connected to the IED interface 106, and a label may be associated with the IED interface 106 and electrical connector 11 of the target IED 10. Steps 1112, 1114. These steps may be repeated until all of the electrical connectors 11 of the target IED 10 have been identified and connected to the IED interface 106. Step 1116, 1118.

Figure 7:
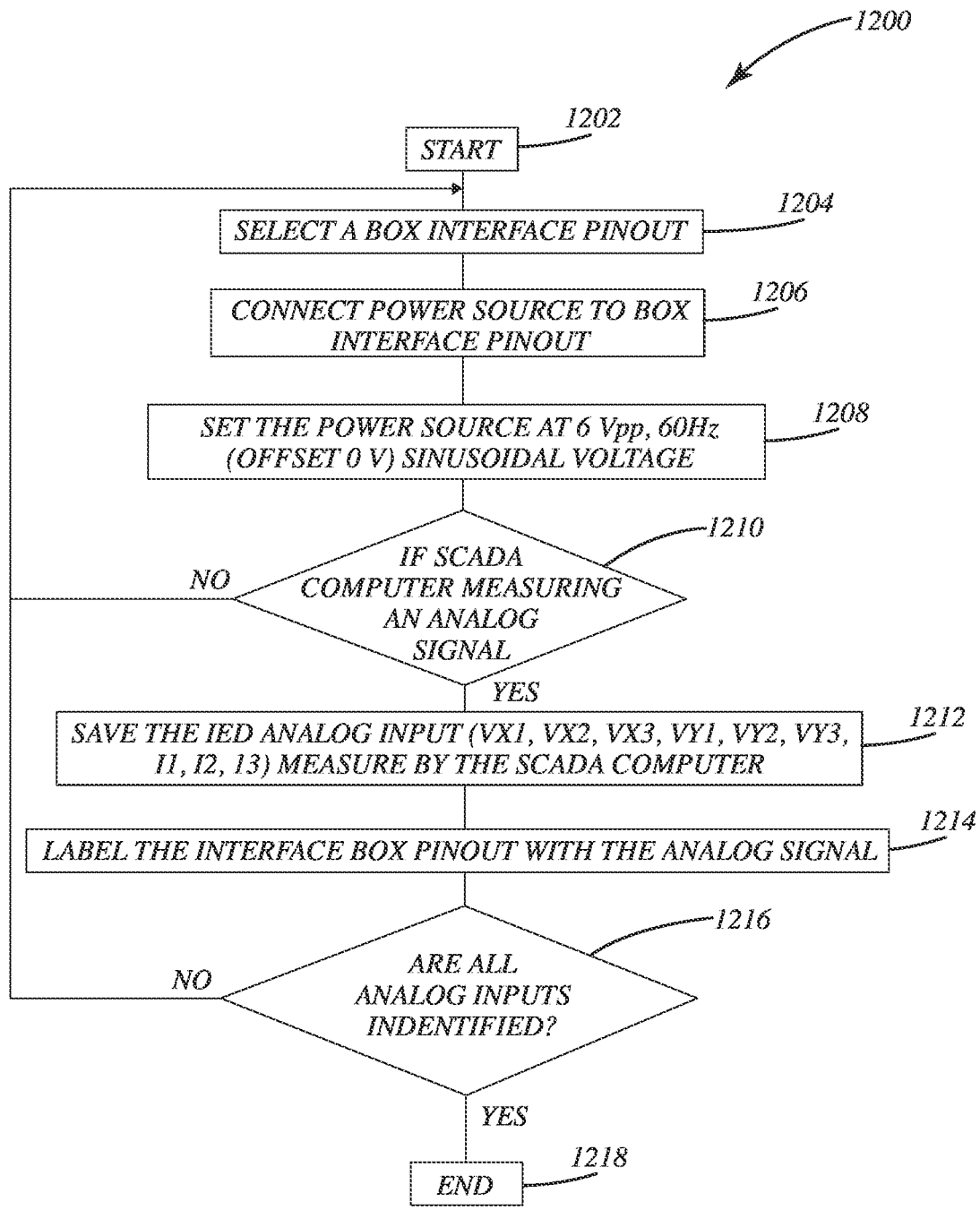
FIG. 7 shows a method in one embodiment according the present disclosure.

During step 1106 of the method 1000 (e.g., the IED inputs phase), the analog and digital inputs of target IED 10 can be identified in accordance with a method 1200 shown in FIG. 7. The target IED 10 may be connected to the second HMI 20 (SCADA computer) with a serial cable 22. The manufacturer software of the target IED 10 may be used to measure the A-B-C phase currents, A-B-C phase-to-ground voltages, and A-B-C breaker pole states. The IED interface 106 may be connected to the target IED 10, and the power source 102 may be coupled to each connector of the IED interface 106, one by one, in order to identify the input signals by monitoring the second HMI 20 (the SCADA computer). Steps 1202, 1204, 1206. The A-B-C phase currents and A-B-C phase-to-ground voltages can be identified by injecting a 6 V peak-to-peak sinusoidal signal of 60 Hz, and monitoring the phase current and phase-to-ground voltage magnitudes on second HMI 20. After each analog input of the IED inputs 210 has been identified, the identified analog input may be associated with a label (e.g., a software labor a physical label) that corresponds to the type of analog input (e.g., the A-B-C phase currents and the A-B-C phase-to-ground voltages on both sides of the respective A-B-C breakers). Step 1212, 1214. These steps may be repeated until all of the analog inputs have been identified. Steps 1216, 1218.

Figure 8:
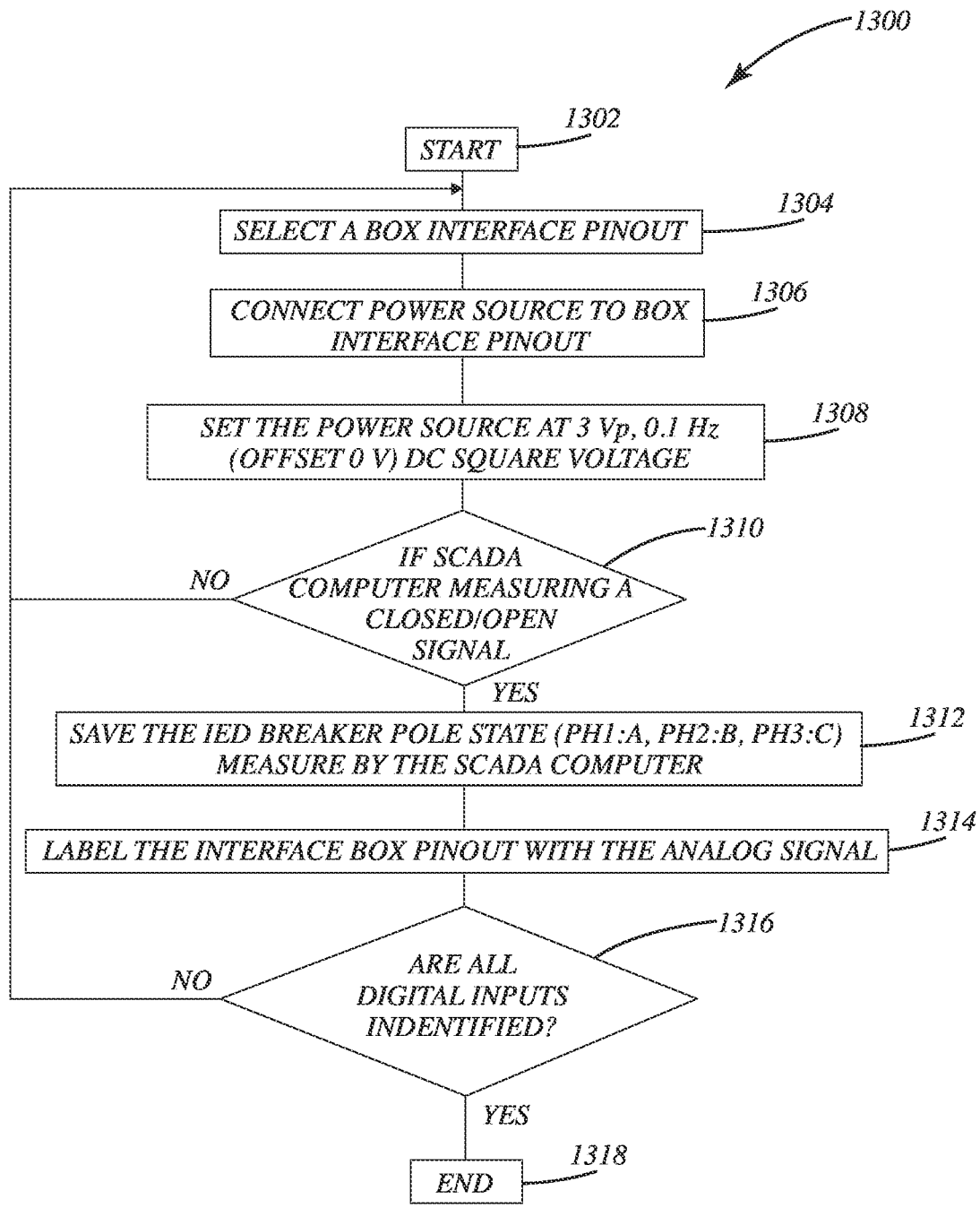
FIG. 8 shows a method in one embodiment according the present disclosure.

The digital inputs of the IED inputs 210 may be identified at step 1006 in accordance with the method 1300 depicted in FIG. 8. In the illustrated embodiments, the A-B-C breaker pole state pinouts or inputs may be identified by applying 3 V pulse signals of 0.1 Hz, and monitoring how the breaker poles are opened and closed each 5 s on the second HMI 20. Steps 1302, 1304, 1306, 1308, 1310. If a digital input is identified, a label may be associated with the digital input in accordance with the A, B, or C breaker pole state input. Each input may be tested accordingly until all of the digital inputs have been identified. Steps 1312, 1314, 1316, 1318.

The open and close duration time of a breaker can represent one cycle (periodic time), which is also given as the inverse of the signal frequency. The same duration time (e.g., 5 seconds) to open and close the A-B-C breaker pole states can be measured on the second HMI 20, for a 50% duty square voltage signal frequency (0.1 Hz) and can be calculated as follows:

$$t_{open-close} = 0.5 \times \frac{1}{f_{pulse}}$$

where $t_{open-close}$ is the open and close time for breaker pole states measured on the second HMI 20 in seconds, and $f_{pulse}$ is the frequency of pulse voltage signal generated by the power source 102 in hertz.

In the scaling factor phase at step 1008 of the method 1000, the IED pinouts for one or more phase current signals and one or more phase-to-ground voltage signals can be tested to find the current and voltage scaling factors, respectively. For instance, the current and voltage scaling factors can be determined for A-phase with the power source 102, and these determined scaling factors can be associated with the B and C phases.

Figure 9:
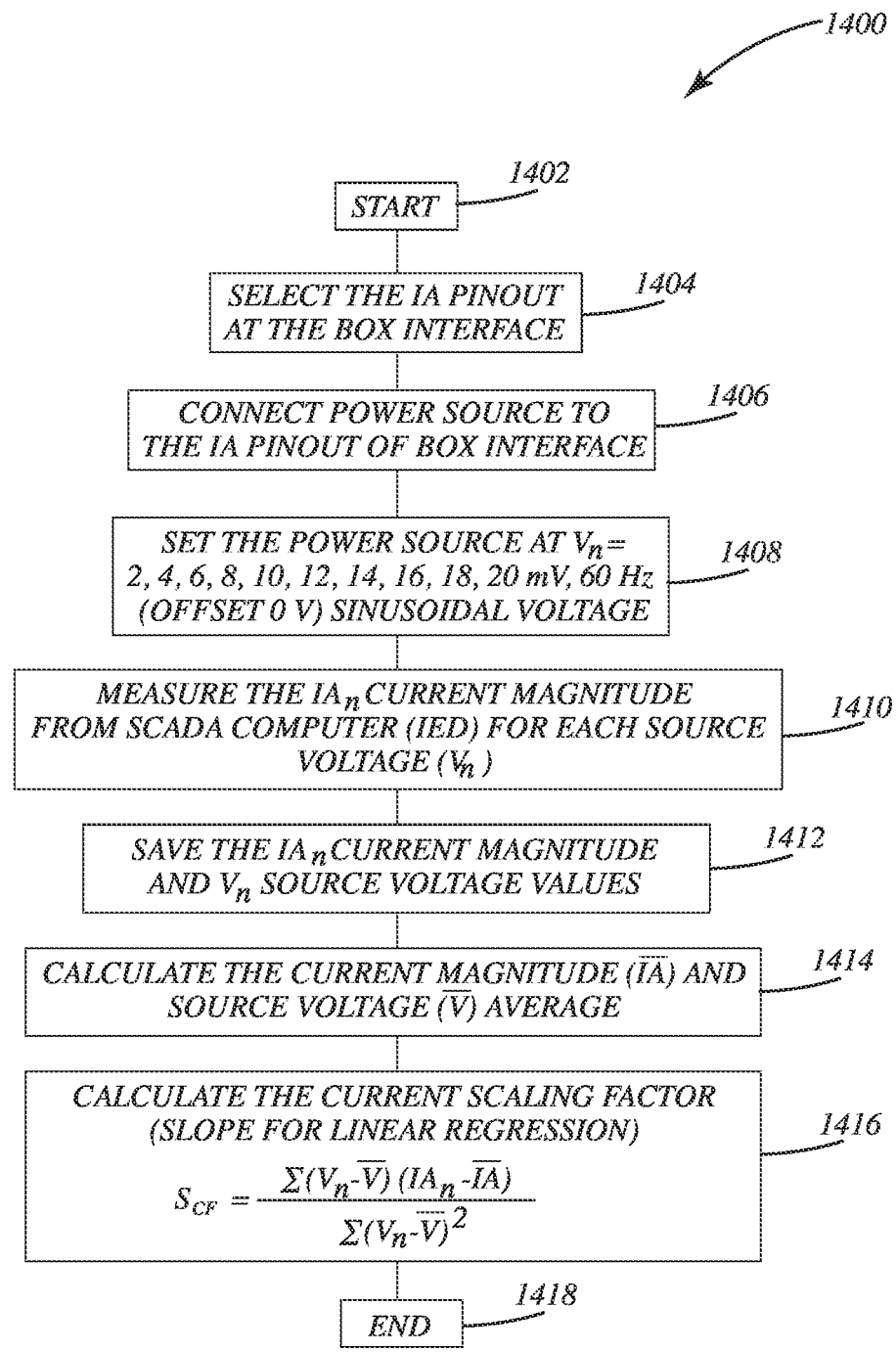
FIG. 9 shows a method in one embodiment according the present disclosure.
Figure 10:
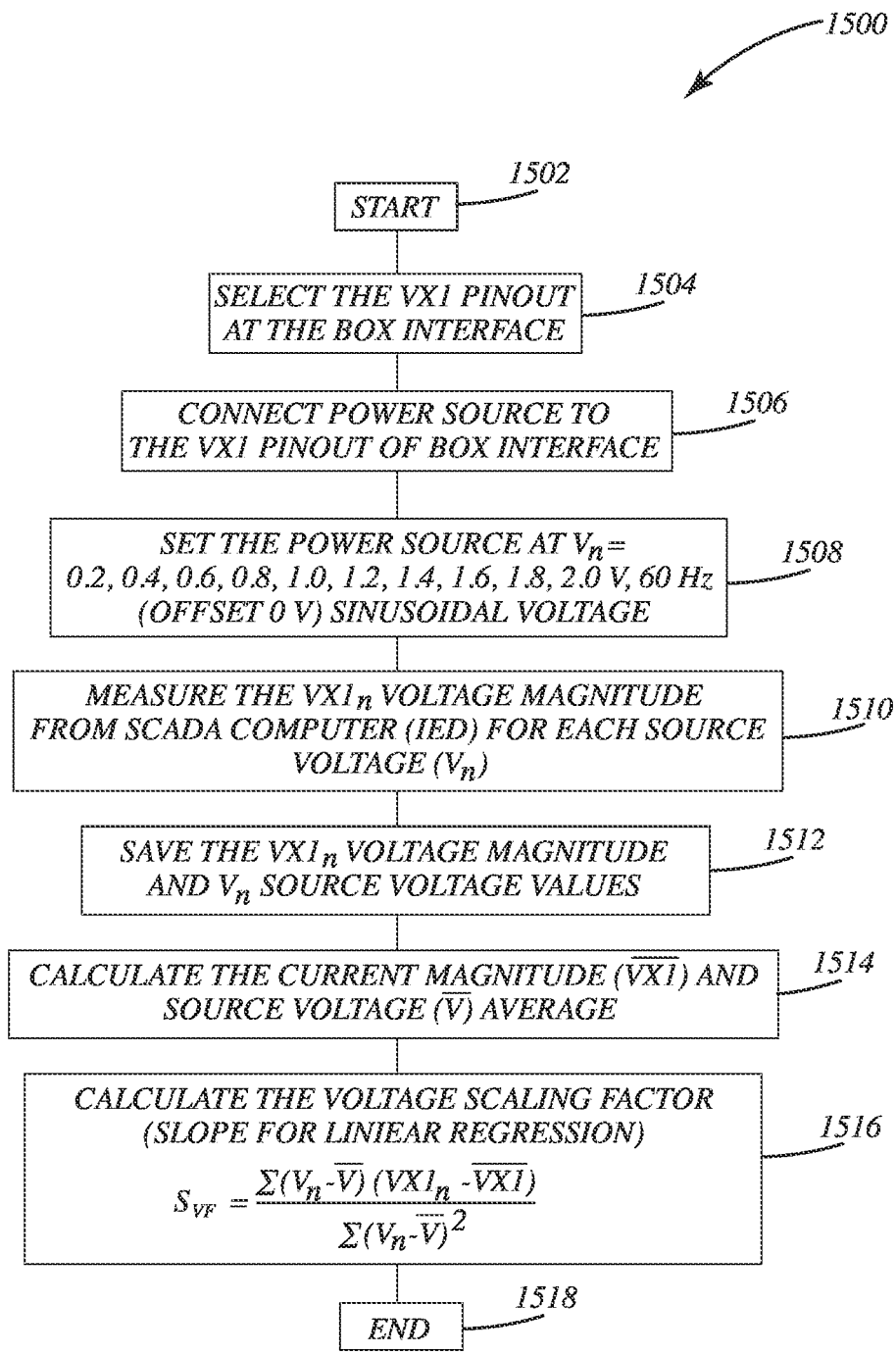
FIG. 10 shows a method in one embodiment according the present disclosure.

The scaling factors may be determined in accordance with the methods 1400, 1500 shown in FIGS. 9 and 10. The A-phase current (I1) and phase-to-ground voltage (VX1) electrical connections have been previously identified for IED interface 106. These electrical connectors 11 may be tested at different sinusoidal voltage magnitudes (e.g., different voltage magnitudes at a frequency of 60 Hz). In addition, the measured primary voltages and currents may be collected from the second HMI 20. The applied values can be compared against the measured values to determine the scaling factors. Steps 1402, 1404, 1406, 1408, 1410, 1412 as well as steps 1502, 1504, 1506, 1508, 1510, 1512

The current and voltage scaling factors can be estimated by calculating the slope for a linear regression. For example, the current scaling factor for the target IED can be calculated as follows:

$$S_{CF} = \frac{\Sigma(V_n - \overline{V})(IA_n - \overline{IA})}{\Sigma(V_n - \overline{V})^2}$$

where $S_{CF}$ is the current scaling factor in amperes/volts, $V_n$ is the voltage set at the power source for each test in volts, $\overline{V}$ is the average of voltages set at the power source for all tests in volts, $IA_n$ is the primary A-phase current (I1) on the second HMI 20 for each test in amperes, and $\overline{IA}$ is the average of primary A-phase currents on the second HMI 20 for all tests in amperes. Steps 1414, 1416, 1418.

The voltage scaling factor for IED can be calculated as follows:

$$S_{VF} = \frac{\Sigma(V_n - \overline{V})(VX1_n - \overline{VX1})}{\Sigma(V_n - \overline{V})^2}$$

where $S_{VF}$ is the voltage scaling factor in volts/volts, $V_n$ is the voltage set at the power source for each test in volts, $\overline{V}$ is the average of voltages set at the power source for all tests in volts, $VX1_n$ is the primary A-phase-to-ground voltage (VX1) on the second HMI 20 for each test in volts, and VXT is the average of primary A-phase-to-ground voltages on the second HMI 20 for all tests in volts. Steps 1514, 1516, 1518.

Figure 11:
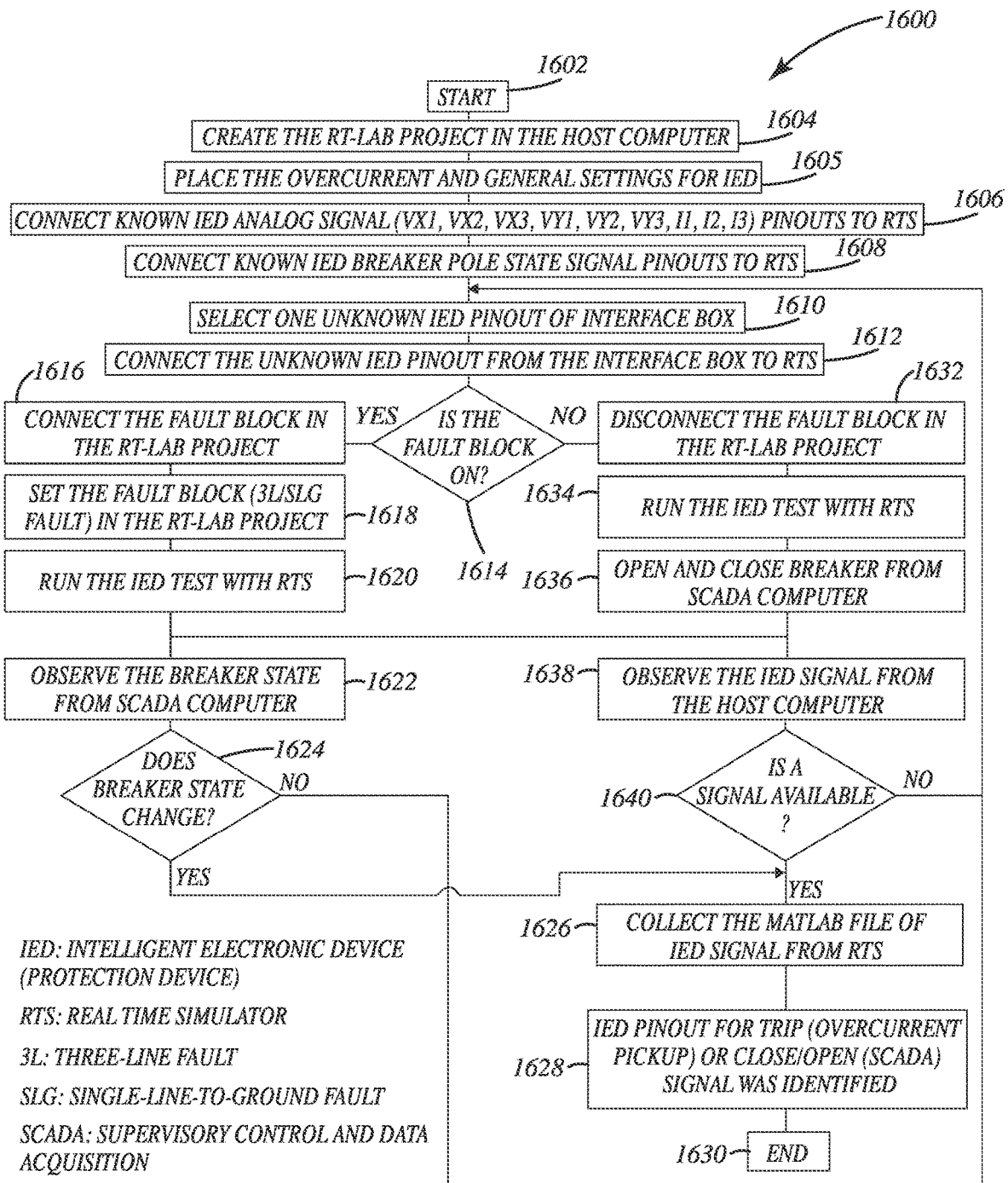
FIG. 11 shows a method in one embodiment according the present disclosure.

In the IED output phase conducted at step 1010 of the method 1000, the output signals of the target IED 10 can be determined in a variety of ways, including the method 1600 depicted in the illustrated embodiment of FIG. 11. By conducting the method 1600 (potentially with and without a fault block), IED output signals, such as the trip signals for overcurrent settings, and close/open signals from the SCADA computer, can be identified with the control system 108 (e.g., RTS) and the target IED 10 in the loop.

In the illustrated embodiment, the target IED 10 may be set with an inverse time overcurrent setting, and an RT-LAB control system may be operated via the control system 108 to conduct the method 1600 (with and without a fault block). Steps 1602, 1604, 1605. Then, all previously found IED analog (phase-to-ground voltages and phase currents) and digital (breaker pole states) signal pinouts may be connected to the control system 108 through the IED interface 106. Step 1606, 1608.

Each currently unidentified or unknown IED pinout from IED interface 106 may be connected to the control system 108, one by one, to identify the IED trip (overcurrent pickup) and close/open (SCADA) pinouts of the target IED 10. Steps 1610, 1612.

If the fault mode is enabled, the IED trip (overcurrent pickup) pinouts can be identified by monitoring the trip signal being generated by target IED 10. Steps 1614, 1616, 1618, 1620, 1622, 1624. If the fault mode is disabled, the close/open (SCADA) pinouts can be identified by operating the breaker close/open inputs from the second HMI 20, and by monitoring the close/open IED signals from the first HMI 110. Steps 1614, 1632, 1634, 1636, 1638, 1640.

Additionally, the signals for IED trip (overcurrent pickup) and close/open (SCADA) pinouts can be saved in memory to facilitate configuring the trip and close circuits to update the control system. Steps 1626, 1628, 1630.

To identify the IED trip (overcurrent pickup) pinouts, the target IED 10 (operable as a protection device) may be set with the inverse time overcurrent setting based on the U4 (US Extremely Inverse) current-time curves. The calculated protection device time may be determined as follows:

$$T_{PD} = \left\{ \left[ 0.02434 + \frac{5.64}{\left(\frac{I_{rms}}{I_{min-pickup}}\right)^2 - 1} \right] \times TD \right\} + TS \right\} \times 60$$

where $T_{PD}$ is the calculated protection device time in cycles, $I_{rms}$ is the nominal power frequency (fundamental) current in amperes measured by the target IED 10, $I_{min-pickup}$ is the minimum power frequency (fundamental) pickup current in amperes at which the time-overcurrent curve begins timing, TD is the time dial (time multiplier) setting in seconds, and TS is the time adder in seconds.

III. Test System

In the functionality phase or step 1012 of the method 1000, the IED pinout functions can be validated with the control system 108 by running a series of fault tests, and collecting the results from the first and second HMIs 20, 110.

In one embodiment, a test system (e.g., an RT-LAB control system) may be formed with a two-source power system and with the IED breakers between these two power sources. The phase currents and phase-to-ground voltages at both sides of IED breakers can be measured, and the two-source power system can operate the fault tests in forward and reverse current directions. The functionality of IED inputs/outputs can be validated by measuring the magnitudes for the phase-to-ground voltages and phase currents, current directions, and breaker pole states from the first and second HMIs 20, 110 at fault tests.

In one embodiment, and for purposes of disclosure, the target IED 10 may be selected as an IntelliRupter as a protective relay. The target IED 10 can be installed with different CTs. IntelliRupters are manufactured with defined current sensors, and are capable of measuring currents in the range from 1 to 16,000 amperes. In addition, while the inverse time overcurrent settings in many IEDs operable as protective relays are set with the pickup current based on the secondary current of CTs, and the IntelliRupters are set with the pickup current (primary current) based on the power grid. In this embodiment, the IntelliRupter may be set with a $I_{min-pickup}$ of 800 amperes for all tests. Table 1 below identifies the fault tests and overcurrent settings for the target IED 10 in accordance with one embodiment.

TABLE 1

Fault tests and overcurrent settings for the target IED

| Test ID | Direc. | Curve | Min. pickup current, $I_{min-pickup}$ (A) | Low current cutoff (A) | Time dial, TD (s) | Time adder, TS (s) | Type of fault |
|---|---|---|---|---|---|---|---|
| AG-4884A-Direc2-U4-800A-5 | 2 | U4 | 800 | 800 | 5 | 0 | AG |
| BG-4884A-Direc2-U4-800A-10 | (Reverse) | | | | 10 | | BG |
| CG-4884A-Direc2-U4-800A-15 | | | | | 15 | | CG |
| ABC-10211A-Direc1-U4-800A-5 | 1 | | | | 5 | | ABC |
| ABC-10211A-Direc1-U4-800A-10 | (Forward) | | | | 10 | | ABC |
| ABC-10211A-Direc1-U4-800A-15 | | | | | 15 | | ABC |

Figure 12:
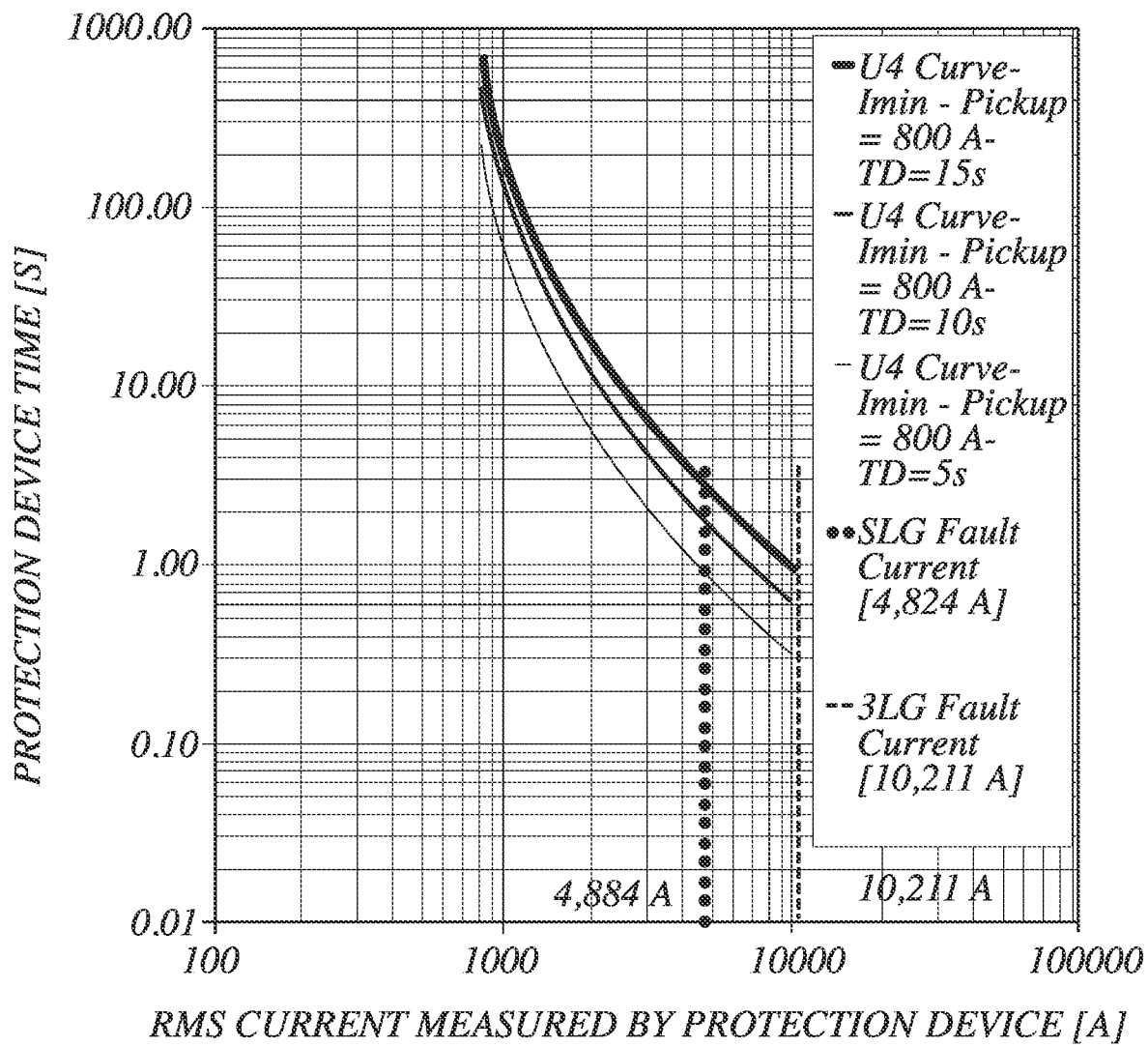
FIG. 12 shows a determined protection time with respect to measured current in accordance with one or more tests in one embodiment according the present disclosure.

Test ID: Fault type-Fault current-Direction setting-Inverse curve setting-Minimum pickup current setting-Time dial setting The fault tests can be conducted at different overcurrent settings for the reverse and forward current directions at SLG (AG/BG/CG) and 3L (ABC) fault tests, respectively. The target IED 10 may be configured with an U4 inverse time-overcurrent curve, a minimum pickup current of 800 A, a low-current cutoff of 800 A, and a time dial of 5, 10, and 15 s. The inverse time overcurrent curves are depicted in the illustrated embodiment of FIG. 12 using the equation identified herein for calculating protection device time. In the illustrated embodiment of FIG. 12, the inverse time overcurrent curves start at a minimum pickup current of 800 A, and are applied for the reverse (4,884 A) and forward (10,211 A) currents at SLG and 3L fault tests, respectively.

Figure 14:
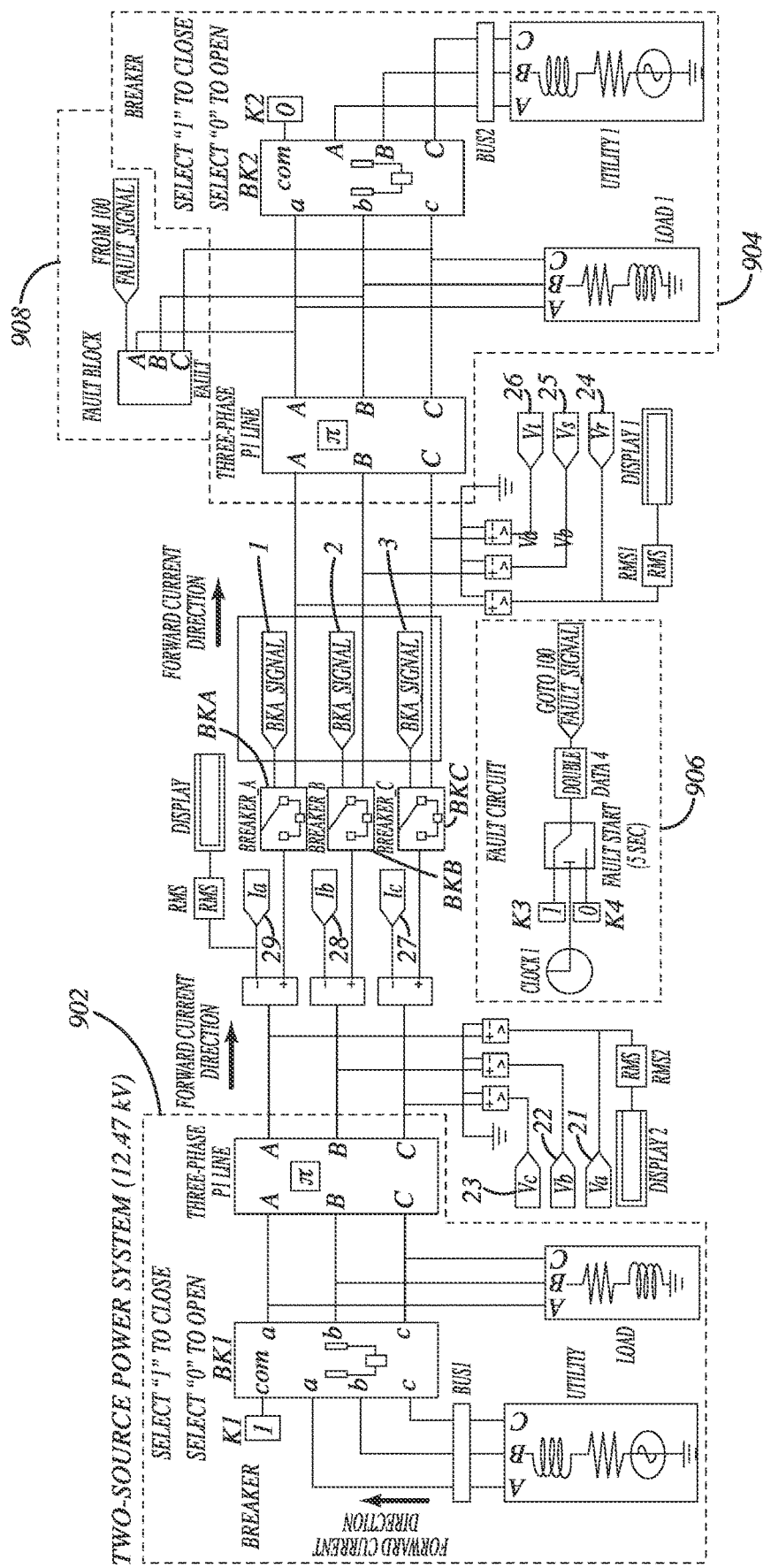
FIG. 14 depicts a test system in one embodiment according the present disclosure.

In the illustrated embodiment of FIG. 14, a test system 900 in accordance with one embodiment is depicted. The test system 900 may include first and second power sources 902, 904 operable to supply power to breaker A BKA, breaker B BKB, and breaker C BKC. The first and second power sources 902, 904 may each be configured to supply three-phase power in the form of phases A, B, and C. Each power source 902, 904 may include a load operable to receive power from the respective power source 902, 904 and the other power source 902, 904 to the extent power is allowed to pass through the breakers BKA, BKB, BKC. Each power source 902, 904 may be selectively controlled to supply power via control breakers BK1, BK2. In the illustrated embodiment, the control breaker BK1 of the first power source 902 may be operated in a mutually exclusive relationship with the control breaker BK2 of the second power source 904 such that the first and second power sources 902, 904 do not supply power to the loads at the same time.

The test system 900 may include a plurality of sensors operable to generate sensor output indicative of voltage of phases A, B, C on both sides of the breakers BKA, BKB, BKC, and sensor output indicative of a current of the phases A, B, C. In the illustrated embodiment, the sensor output is identified as follows: VA (VX1)→21; VB (VX2)→22, VC (VX3)→23, VR (VY1)→24, VS (VY2)→25, VT (VY3)→26, IA→29, IB→28, IC→27.

Figure 15:
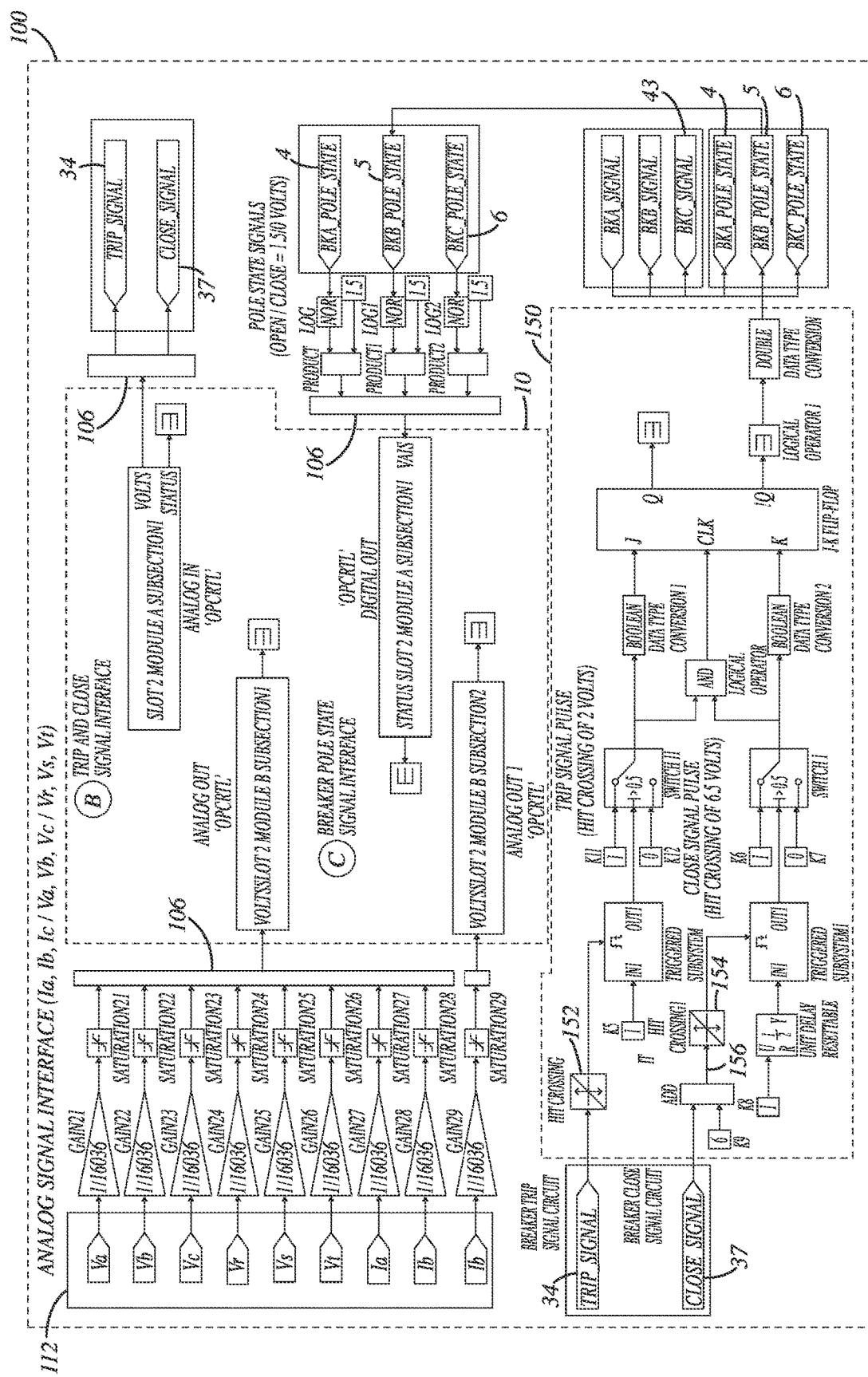
FIG. 15 depicts the test system in one embodiment according the present disclosure.

These sensor outputs of the test system 900 may be provided to the system 100 as sensor input 112, as depicted in the illustrated embodiment of FIG. 15. The system 100 may scale the sensor input 112 in accordance with one or more scaling factors and supply the scaled output to the target TED 10 via the TED interface 106. The scaling factors may be controlled in accordance with one or more scaling factors determined in accordance with the method 1000. In other words, the primary phase currents and phase-to-ground voltages in the illustrated embodiments may be scaled into low-level voltage signals that allow the target IED 10 to operate internally using low voltage instead of high voltage signals. The test system 900 may include signal conditioning circuitry (e.g., Saturation 21-29) operable to limit signals to be within an operable range of the target IED 10 to avoid damaging the low level interface or other circuitry of the target IED 10.

The test system 900 may include a fault circuit 906 and a fault block 908 operable to control fault conditions in accordance with one or more of the fault tests identified in Table 1.

The test system 900, including the first and second power source 901 and RTS test beds, may be used to identify the IED pinout locations and signals in accordance with the method 1000. The test system 900 may identify the pinout locations and signals for breaker pole states, primary phase currents and primary phase-to-ground voltages. The test system 900 may identify the pinout locations and signals for the trip (overcurrent pickup) and close/open (SCADA) states.

The test system 900 may also be used to validate the functionality of IED pinouts in accordance with step 1012 of the method 1000. For instance, with the target IED 10 being an IntelliRupter operable as a protection device with unknown pinouts, the test system 900 may be operable to determine the IED pinouts 200 that are initially unknown.

In the illustrated embodiments of FIGS. 14 and 15, with the target IED 10 having one or more IED pinouts 200 that are unknown, the breaker pole state signals may be referred to as a voltage signal level that opens or closes the breakers. The breaker pole state signals for each of the breakers BKA, BKB, BKC are identified as follows: BKA_SIGNAL→41, BKB_SIGNAL→42, BKC_SIGNAL→43. The test system 900 may be configured to supply the breaker pole state signals 41, 42, 43 as breaker pole states 4, 5, 6 to the target IED 10 via the IED interface 106.

The power source 102 may be controlled in accordance with the method 1000 to identify the IED pinouts for A, B, and C breaker pole states using a 3 V pulse signal of 0.1 Hz (or a frequency increment of 0.1 Hz), and monitoring opening and closing of the breaker poles each 5 s on the second HMI 20, which can be established in accordance with the equation for determining the duration of the open and close states described herein. The IED pinouts of phase currents and phase-to-ground voltages may be identified by injecting a 6 V peak-to-peak sinusoidal signal of 60 Hz, and monitoring the magnitude of the phase currents and phase-to-ground voltages on the second HMI 20.

The test system 900 may also be used to identify the trip (overcurrent pickup) and close/open (SCADA) signals, and for validation of the functionality of the IED pinouts. The control system 108 (e.g., an OP4510) may be used as a target computer (RTS) that can be controlled by the first HMI 110.

In one embodiment, before running a series of fault tests in accordance with one or more methods of the present disclosure, the overcurrent settings may be established using a serial communication between the second HMI 20 and the target IED 10. After running the fault tests, the results may be collected from the first HMI 110.

In the test system 900, the previously identified IED pinouts (phase-to-ground voltages, phase currents, and breaker pole states) may be connected to the test system 900 via the IED interface 106. Then, the fault tests may be conducted. The unknown IED pinouts from the IED interface 106 may be connected to the test system 900, one by one, to identify the pinout locations and type of signals for the trip (overcurrent pickup), and the SCADA close/open states. Also, the test system 900 may validate the functionality of IED pinouts during the fault tests.

IV. Simulation and Validation

In one embodiment, with the test system 900, a control methodology in accordance with one or more embodiments described herein may be provided for the first HMI 110 and the control system 108. The first and second power sources 902, 904 may correspond to 12.47 kV power sources, and the A, B, and C phase breakers may be connected at the IED pinouts.

The control system 108 (e.g., via MATLAB, Simulink, and RT-LAB software) may simulate the two-source 902, 904 and the fault tests (e.g., the fault inputs). In the system 100 depicted as part of the test system 900 in FIG. 13, the system 100 receives sensor output for the two-source power system, and provides this sensor output to a sensor system 120, which may be internal or external to the system 100. Additionally, breaker pole states A, B, C, the trip signal, and the close signal may be provided to the sensor system 120 as depicted in the illustrated embodiment. The sampling rate of the sensor system 120 in the illustrated embodiment is shown as being 20 kHz (with a discrete time step of 50 us);

however, the sampling rate may vary from application to application. The system 100 may generate the signals depicted in FIG. 13 without actual presence of the two sources 902, 904. For instance, the system 100 may generate the analog signals 21-27 with appropriate scaling for feeding the signals directly as low-voltage signals to the target IED 10 without generating the actual high-voltage signals or as simulated signals to a target IED 10 that, itself, is simulated.

In the illustrated embodiment, the test system 900 may include an interface controller operable to integrate the control system 108 with the target IED 10 in the loop. In the two-source power system, the fault circuit 906 may be operable to generate a signal at 5 s to activate the fault block 908, which can be set for the SLG and 3L fault tests shown in Table 1.

For the fault tests, the forward (direction 1) and reverse (direction 2) current directions can be established by the source breakers BK1, BK2, or alternatively via simulation of the corresponding signals for the forward and reverse current directions. In the fault tests, the phase currents, phase-to-ground voltages, breaker pole states, and trip (overcurrent pickup) and close signals may be obtained by the sensor system 120 of FIG. 13. The sensor system 120 may obtain one or more of the phase currents phase-to-ground voltages, breaker pole states, and trip (overcurrent pickup) and close signals via direct measurement by the sensor system 120 or via communication from a remote sensor system that communicates a measurement to the sensor system 120, or any combination thereof.

In the two-source power system, the primary phase currents and phase-to-ground voltages from the A, B, and C phase breakers may be obtained by the sensor input 112 of the test system 100 of the illustrated embodiment of FIG. 15.

In the illustrated embodiment of FIG. 15, the measured primary phase currents and phase-to-ground voltages can be converted into low-level voltage signals by the current (36,064 A/V) and voltage (16,036 V/V) scaling factors, respectively, using gain blocks. The gains may be equal to the inverse of the scaling factors, because the target IED 10 is often connected to sensors that provide low voltage signals. Other target IEDs (like SEL protective relays), however, could be connected to iron-core measurement transformers. The gain blocks may be equal to the inverse of the scaling factors and measurement transformer ratios to be set on the target IED 10. Additionally, the low-level voltage signals may be limited by saturation blocks to protect the analog signal pinouts of the target IED 10.

In the illustrated embodiment of FIG. 15, a trip and close signal interface 150 is provided to obtain the trip (overcurrent pickup) and close (SCADA) signals from the target IED 10 in the loop through the trip signal 34 (e.g., breaker trip signal) and the close signal 37. The state of the A, B, and C phase breakers may be obtained from the breaker pole state signal interface, and these states and may be provided to the target IED 10 in the loop with the system 100 and the test system 900.

Figure 16A:
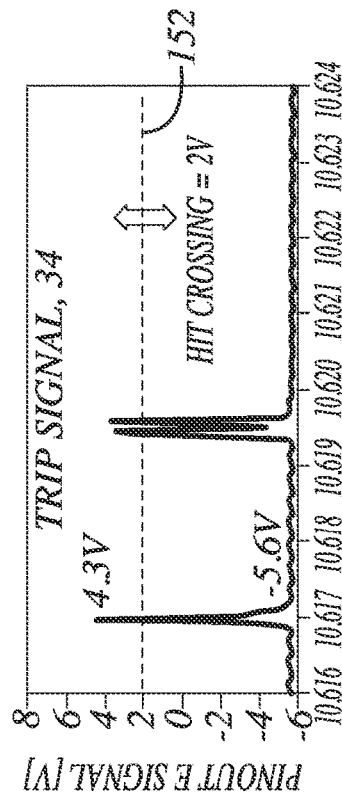
FIG. 16A shows measurements for a trip signal.
Figure 16B:
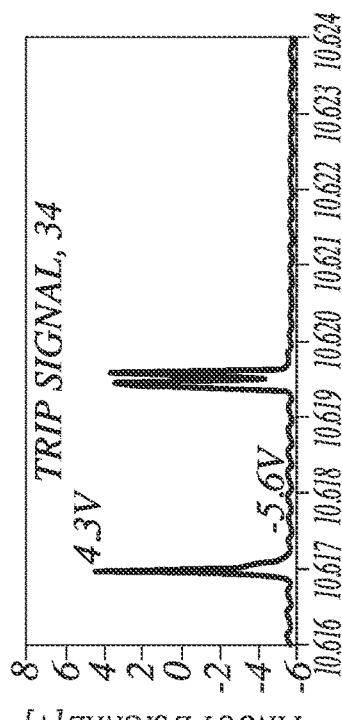
FIG. 16B shows measurements for the trip signal along with a threshold.
Figure 17A:
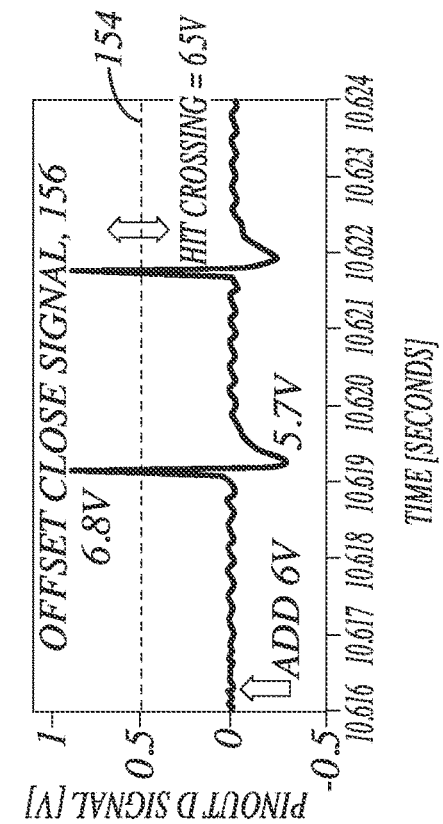
FIG. 17A shows measurements for a close signal.
Figure 17B:
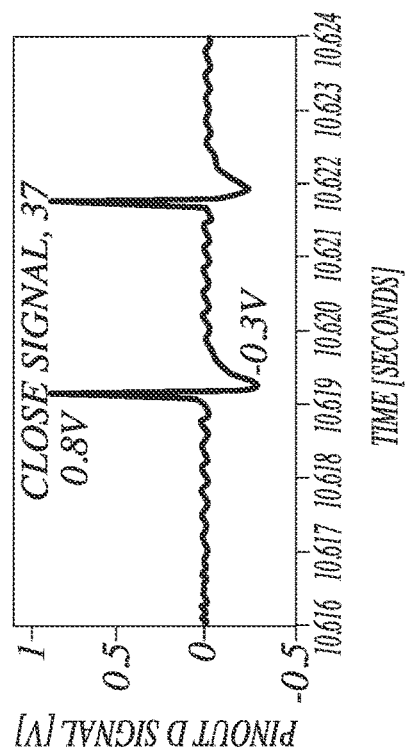
FIG. 17B shows measurements for the close signal along with a threshold an offset.

The trip and close signal interface 150 in the illustrated embodiment of FIG. 15 may be configured based on sensor information obtained with respect to the trip (overcurrent pickup) signal and the close signal (e.g., from the second HMI 20) from the target IED 10. The illustrated embodiments of FIGS. 16A-B show the trip (overcurrent pickup) signal 34, and FIGS. 17A-B show the close (SCADA) signal 37.

For instance, the trip signal 34 may be detected by a hit crossing block 152 in the illustrated embodiment of FIG. 15 set at a threshold (e.g., a 2 V threshold). To avoid overlapping of states for the trip signal 34 and the close signal 37, an offset (e.g., 6V) may be added via an offset block 156 to the close signal 37, and a hit crossing block 154 in the illustrated embodiment of FIG. 15 for the close signal 37 may be set at a threshold that accounts for the offset (e.g., 6.5 V). For the target IED 10, the trip (overcurrent pickup) and close (SCADA) signals can be generated at the same time. Then, to control the breaker model with one signal (close=1, open=0), a J-K flip-flop and unit delay resettable block may be provided in the breaker trip circuit of the trip and close signal interface 150. In the illustrated embodiment of FIG. 13, the sensor system 120 is depicted as obtaining the phase currents, phase-to-ground voltages, breaker pole states, trip signal, and the close signal. During fault tests, the measurement displays 122, 124 in the illustrated embodiment of FIG. 13 may be provided automatically to supervise the fault tests during the real-time simulations.

V. Simulation Results

Figure 13:
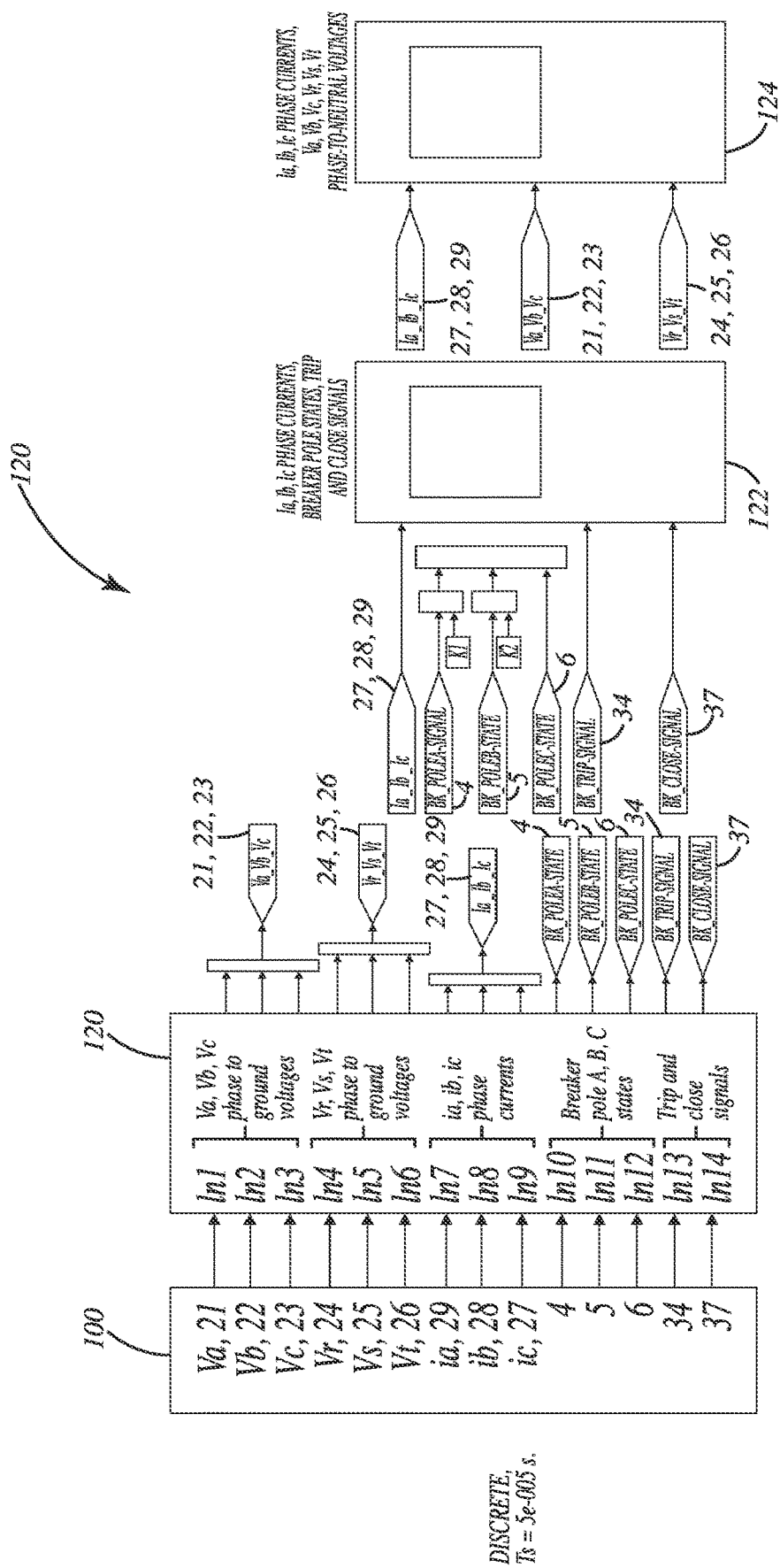
FIG. 13 shows a system in one embodiment according to the present disclosure.

In one embodiment of the system 100 depicted in of FIG. 13, the simulation results can be collected in conjunction with the test system 900. The system 100 may be used to identify the IED inputs and outputs, respectively. The analog (phase currents and phase-to-ground voltages) and digital (breaker pole states) signal pinout locations can be identified, and the voltage and current scaling factors can be calculated. Tests for the analog and digital signals can be conducted based on the methods 1200, 1300, respectively. The tests for current and voltage scaling factors can be conducted based on the methods 1400, 1500, respectively. The power source 102 in the illustrated embodiment of FIG. 2 may be set at a 60 Hz sinusoidal voltage from 2 to 20 mV and 0.2 to 2.0 V for the current and voltage scaling factor tests, respectively. The A-phase current (I1) and A-phase-to-ground voltage (VX1) magnitudes can be measured from the second HMI 20. The test results for the current and voltage scaling factors, and for analog and digital signals with respect to a target TED 10 are shown in Table 2.

TABLE 2

| | | Test Results | | | |
|---|---|---|---|---|---|
| | | Current scaling factor tests (Method 1400) | | Voltage scaling factor tests (Method 1500) | |
| Tests | | Power source voltage (mV) | IED SCADA I1 (A) | Power source voltage (V) | IED SCADA VX1 (V) |
| Scaling factors | 1 | 2 | 80 | 0.2 | 3,200 |
| | 2 | 4 | 155 | 0.4 | 6,500 |
| | 3 | 6 | 225 | 0.6 | 9,700 |
| | 4 | 8 | 299 | 0.8 | 12,800 |
| | 5 | 10 | 360 | 1.0 | 16,000 |

TABLE 2-continued

| Test Results | | | | |
|---|---|---|---|---|
| 6 | 12 | 445 | 1.2 | 19,200 |
| 7 | 14 | 518 | 1.4 | 22,500 |
| 8 | 16 | 577 | 1.6 | 25,700 |
| 9 | 18 | 653 | 1.8 | 28,900 |
| 10 | 20 | 737 | 2.0 | 32,100 |

| Tests | | Functions of IED inputs (pinout location) |
|---|---|---|
| Analog signals 6 Vpp[1] | Phase-to-ground voltages and phase currents (Method 1200) | VX1 + (f), VX1 − (e), VX2 + (G), VX2 − (g), VX3 + (J), VX3 − (H), VY1 + (L), VY1 − (K), VY2 + (N), VY2 − (M), VY3 + (R), VY3 − (P) IA + (q), IA − (p), IB + (b), IB − (a), IC + (d), IC − (c), |
| Digital signals 3 Vpp[2] | Breaker pole states (Method 1300) | POLE 1 − A(r), POLE 2 − B(s), POLE 3 − C(Y) |

Vpp: peak-to-peak voltage, [1]Sinusoidal voltage of 60 Hz (offset 0 V), [2]Square voltage of 0.1 Hz (offset 0 V) that opens and closes breaker pole states for 5 s.

Figure 18:
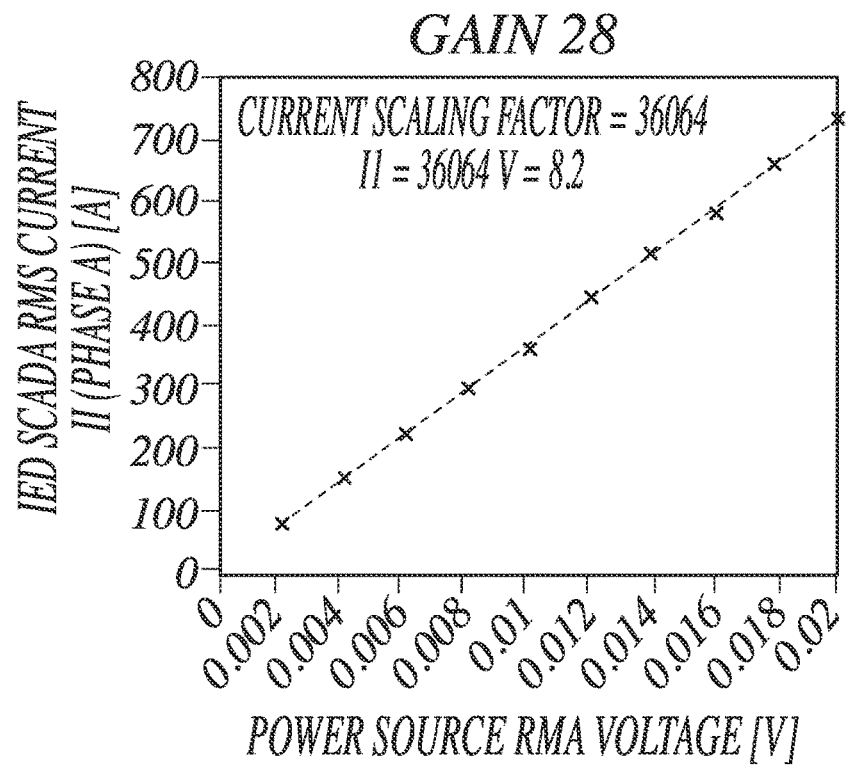
FIG. 18 shows measurements determined in conjunction with calculating a current scaling factor.
Figure 19:
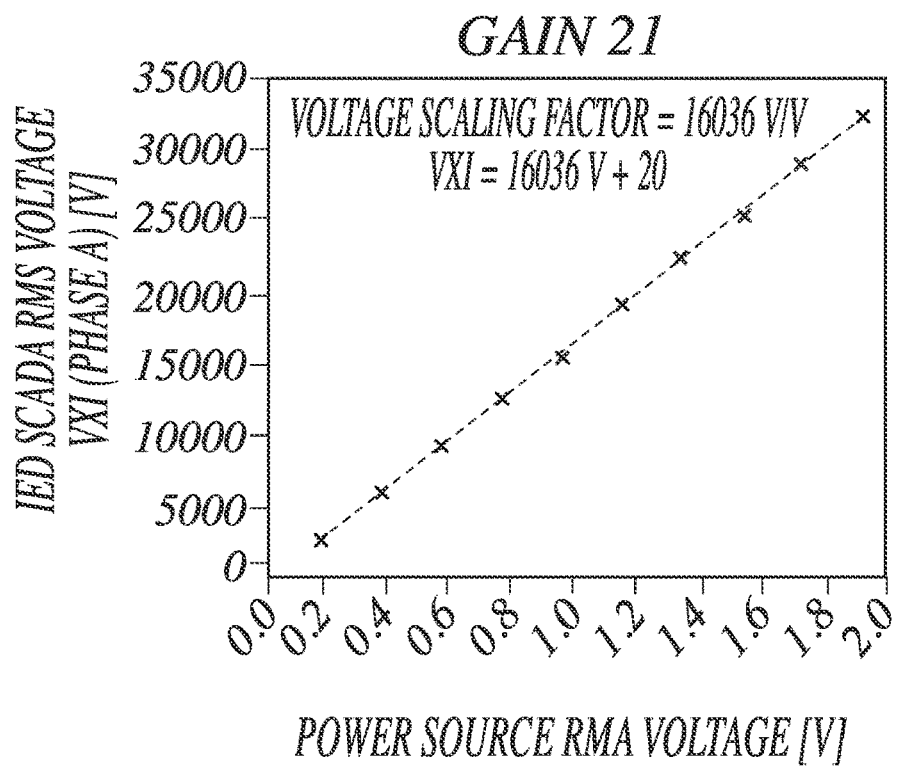
FIG. 19 shows measurements determined in conjunction with calculating a voltage scaling factor.

In the current and voltage scaling factor methods 1400, 1500, the power source voltages and IED output values to the second HMI 20 are plotted on the horizontal and vertical axes, respectively. The slopes for current and voltage scaling factor lines can be estimated as described herein, or by performing an trendline analysis. The current and voltage scaling factors in the example are 36,064 A/V and 16,036 V/V, respectively. The current and voltage scaling factor lines are depicted in the illustrated embodiments of FIGS. 18 and 19, respectively. The trip signal and the close signal can be measured as depicted in FIGS. 16A and 17A, and the functionality of IED inputs/outputs can be validated.

After conducting the fault tests with the test system 900 and target IED 10 in the loop, the measured protection device time can be calculated as follows:

$$T_{PDm} = (T_{EFm} - T_{IFm}) \times 60$$

where $T_{PDm}$ is the measured protection device time in cycles, $T_{EFm}$ is the measured ending fault state time in seconds, and $T_{IFm}$ is the measured initial fault state time in seconds.

Figures 20, 21:
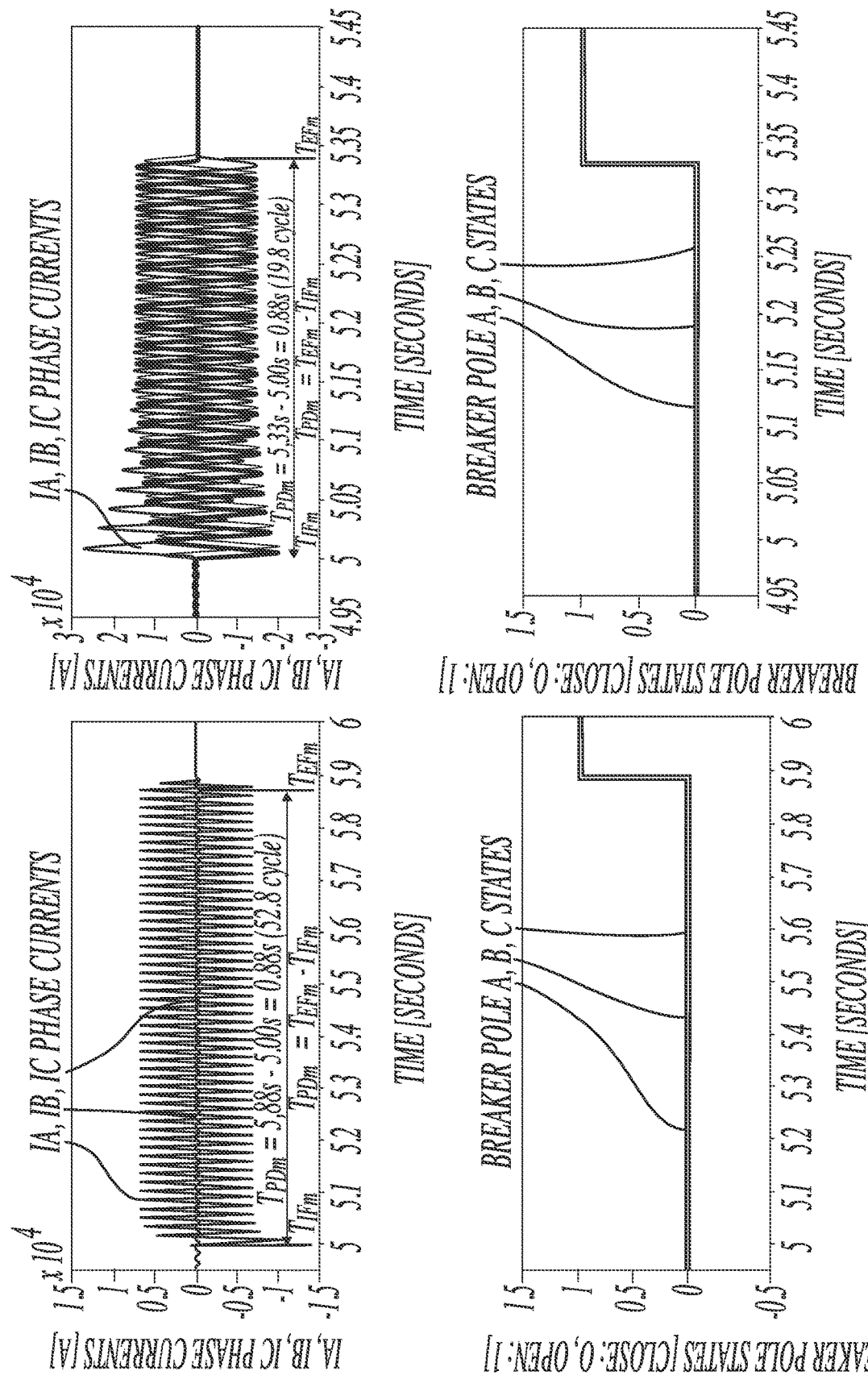
FIG. 20 shows a fault analysis in accordance with one embodiment.
FIG. 21 shows a fault analysis in accordance with one embodiment.

The measured ending and initial fault state times can be collected from the fault events analysis, and the measured protection device time can be calculated as described herein. As an example, the phase currents/breaker pole states for the AG-4884A-Direc2-U4-800A-5 and ABC-10211A-Direc1-U4-800A-5 tests depicted in FIGS. 20 and 21, respectively. These events can be collected from a real-time simulator that simulated the breaker and power system. The breaker may be based on a MATLAB/Simulink model that represents the breaker's ideal behavior without the mechanical and arcing time. The measured protection device time can be determined as equal to the fault clearing time given in FIGS. 20 and 21.

Figure 22:
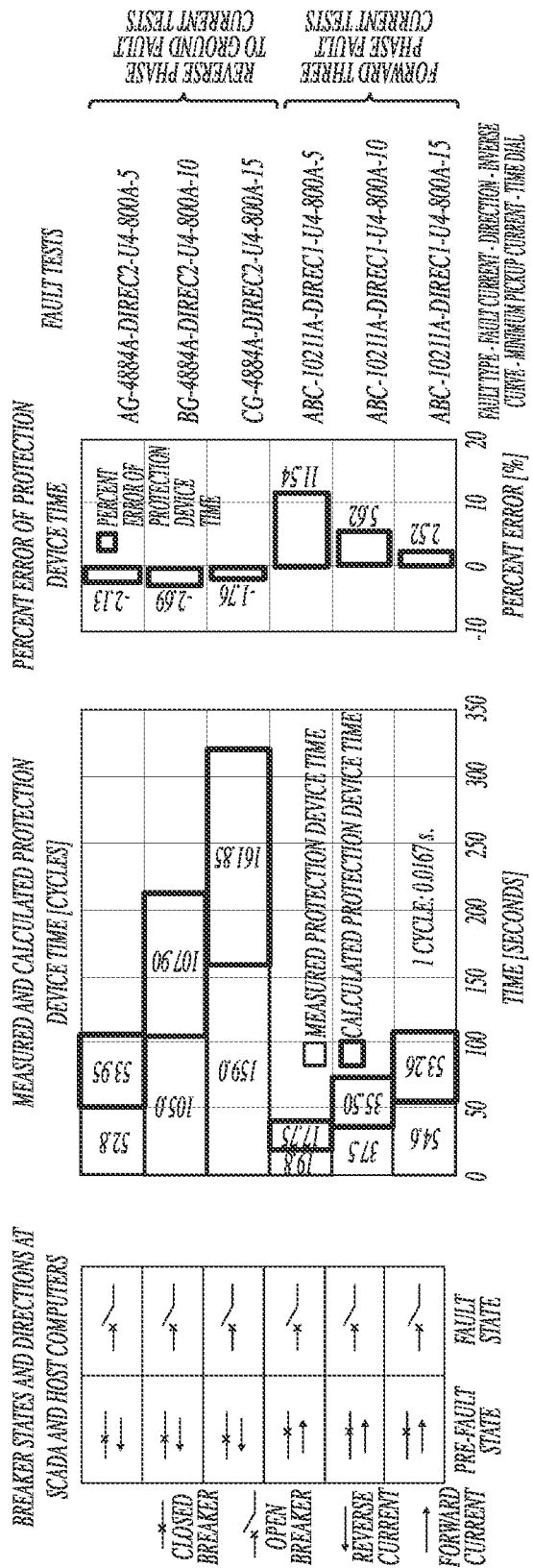
FIG. 22 shows fault analysis for multiple fault conditions in accordance with one embodiment.

In the fault tests, the breaker pole states from the first and second HMIs 20, 110 in the illustrated embodiment of FIG. 3 may be verified during pre-fault and fault states depicted in FIG. 22. The SLG (AG, BG, CG) and 3L (ABC) fault tests can be conducted in reverse and forward current directions, respectively, monitoring the current directions at the pre-fault state. The trip signal can be validated by comparing the calculated and measured protection device times. The calculated protection device time can be calculated as described herein in conjunction with Table 1. Additionally, the percent error of the protection device time can be calculated as follows, using the calculated and measured protection device times, respectively:

$$E_{PD\%} = \left[\frac{T_{PDm} - T_{PD}}{T_{PD}}\right] \times 100$$

where $E_{PD\%}$ is the percent error of protection device time in percentage, $T_{PDm}$ is the measured protection device time in cycles, $T_{PD}$ is the calculated protection device time in cycles.

In the fault tests, the overcurrent settings may indicate that the protection device tripped for the reverse and forward current directions at different time multipliers, validating the trip (overcurrent pickup) and breaker pole state pinouts for the target IED 10. Additionally, the percent error of the protection device time can be used to validate the accuracy of the trip time at different overcurrent settings for the target IED 10, observing in FIG. 22 a percent error of up to −2.69% and 11.54% for the SLG and 3L fault tests, respectively.

The system 100 in one embodiment can be used to identify the current and voltage scaling factors of IEDs to connect RTSs and HIL without analog interfaces. Therefore, test beds without current and voltage amplifiers can eliminate the cutoff frequency limitations of analog interfaces, providing the same frequency range for analog signals between the RTS and IEDs in the loop. The system 100 can enable generation of more realistic test beds, and to find the unknown pinouts for different protective relays, phasor measurement units, smart meters, and other devices. Then, multiple IEDs from different vendors can be wired to RTSs using their low-level voltage signals without current and voltage amplifiers, reducing the cost of test beds.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for determining a low-voltage interface of an intelligent electronic device (IED) of a power system, wherein the low-voltage interface includes one or more of locations of pinouts of the IED, voltage levels of the pinouts, functions of the pinouts, or current and/or voltage scaling factors, the system comprising:
   an interface module including
      a plurality of connectors configured to be electrically connected in one-to-one correspondence to the pinouts of the IED, and
      one or more switches configured to
         provide power to one or more pinouts of the plurality of pinouts of the IED, when a voltage signal from a power source is electrically coupled to the interface module, to selectively provide a sinusoidal signal or a pulse signal to one or more connectors of the plurality of connectors, and
         select testing modes;
   a sensor system operable to identify one or more pinout voltage levels of the IED when the voltage signal from the power source is electrically coupled to the interface module; and
   a controller communicatively coupled with the interface module, the power source, and a supervisory control and data acquisition (SCADA) module operating in conjunction with the IED, wherein the controller is configured to
      obtain, from the SCADA module, signals induced in the IED in response to predetermined voltage inputs by the power source to the IED through a first set of the connectors,
      determine functionality of input pinouts of the IED corresponding to the first set of connectors based on the obtained signals,
      obtain, from the SCADA module, measurements of currents through, and voltages across, the IED corresponding to a sequence of voltages of different amplitudes that is input by the power source to the IED through a first set of the connectors, and
      calculate current- or voltage-scaling factors for the input pinouts based on the obtained measurements.

2. The system of claim 1, wherein as part of determining functionality of each of the input pinouts, the controller is configured to determine that each of the input pinouts corresponds to
   an analog input of the IED associated with an analog phase current or an analog phase-to-ground voltage, or
   a digital input of the IED associated with a breaker pole state.

3. The system of claim 1, wherein the controller is communicatively coupled with a real-time simulator (RTS) with the IED in a loop, and configured to
   obtain, from the SCADA module, signals output by the IED through a second set of the connectors, and
   determine functionality of IED's output pinouts corresponding to the second set of connectors based on the obtained output signals.

4. The system of claim 1, wherein
   the one or more switches are configured to select connectivity between the connectors and the pinouts of the IED, and
   the controller is configured to verify continuity between the connectors and the pinouts of the IED.

5. The system of claim 1, wherein the IED comprises one of a protective relay, a smart meter, a phasor-measurement unit, a microgrid controller or a microcontroller measurement device applied in a power system.

6. A method comprising:
   determining the low-voltage interface of an IED of a power system by using the system of claim 1; and
   operating the IED in connection with an overhead power line low-voltage sensor.

7. The system of claim 1 wherein the pinouts of the IED are electrical contacts.

* * * * *